(12) United States Patent
Kurihara et al.

(10) Patent No.: US 11,070,622 B2
(45) Date of Patent: Jul. 20, 2021

(54) STREET INFORMATION PROCESSING SYSTEM, CLIENT AND SERVER APPLIED TO STREET INFORMATION PROCESSING SYSTEM, AND METHOD AND PROGRAM OF THE SAME

(71) Applicants: KABUSHIKI KAISHA TOSHIBA, Minato-ku (JP); Toshiba Infrastructure Systems & Solutions Corporation, Kawasaki (JP)

(72) Inventors: Shinichi Kurihara, Yokohama (JP); Hiroyuki Abe, Mitaka (JP); Daisuke Takasaki, Kodaira (JP); Shingo Yasunami, Inzai (JP); Hideki Ueno, Urayasu (JP); Yasuo Ooya, Tokyo (JP); Sunao Wada, Yokohama (JP); Yuri Komori, Kawasaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 559 days.

(21) Appl. No.: 15/917,116

(22) Filed: Mar. 9, 2018

(65) Prior Publication Data
US 2018/0198865 A1 Jul. 12, 2018

Related U.S. Application Data

(63) Continuation of application No. PCT/JP2016/076976, filed on Sep. 13, 2016.

(30) Foreign Application Priority Data

Sep. 18, 2015 (JP) .............................. JP2015-184817

(51) Int. Cl.
*H04L 29/08* (2006.01)
*H04M 11/00* (2006.01)
(Continued)

(52) U.S. Cl.
CPC ........ *H04L 67/125* (2013.01); *G06K 9/00496* (2013.01); *G06K 9/00624* (2013.01);
(Continued)

(58) Field of Classification Search
CPC ... H04L 67/125; H04L 67/12; G01C 21/3691; G01C 21/3697; G06K 9/00496;
(Continued)

(56) References Cited

U.S. PATENT DOCUMENTS

2004/0145457 A1* 7/2004 Schofield ................. H04N 7/18
340/425.5
2007/0150187 A1* 6/2007 Kawakami ......... G01C 21/3667
701/431
(Continued)

FOREIGN PATENT DOCUMENTS

JP 2003-125379 4/2003
JP 2005-69839 A 3/2005
(Continued)

OTHER PUBLICATIONS

International Search Report dated Dec. 6, 2016 in PCT/JP2016/076976, filed on Sep. 18, 2015 (with English Translation).

*Primary Examiner* — Michael P Nghiem
*Assistant Examiner* — Dacthang P Ngo
(74) *Attorney, Agent, or Firm* — Oblon, McClelland, Maier & Neustadt, L.L.P.

(57) ABSTRACT

According to an embodiment, a client includes a street information collection unit for collecting street information near an arrangement place, a provision determination unit for determining whether the street information collected by
(Continued)

the street information collection unit is information required to be provided to the server, and a first transmission unit for transmitting the street information, which is determined to be required to be provided by determination of the provision determination unit, to the server, with client identification information for identifying the client.

16 Claims, 14 Drawing Sheets

(51) Int. Cl.
  *G06K 9/00* (2006.01)
  *H04W 88/02* (2009.01)
  *G01C 21/36* (2006.01)
  *H04W 84/18* (2009.01)
  *H04M 11/04* (2006.01)

(52) U.S. Cl.
  CPC .......... *G06K 9/00771* (2013.01); *H04L 67/12* (2013.01); *H04M 11/00* (2013.01); *H04M 11/04* (2013.01); *H04M 11/045* (2013.01); *H04W 88/02* (2013.01); *G01C 21/3691* (2013.01); *G01C 21/3697* (2013.01); *H04W 84/18* (2013.01)

(58) Field of Classification Search
  CPC .......... G06K 9/00624; G06K 9/00771; H04N 11/00; H04N 11/04; H04N 11/045; H04W 88/02
  USPC ........................................................ 702/188
  See application file for complete search history.

(56) References Cited

U.S. PATENT DOCUMENTS

| | | |
|---|---|---|
| 2008/0071470 A1 | 3/2008 | Hasegawa et al. |
| 2010/0208051 A1 | 8/2010 | Tsurumi et al. |
| 2011/0257883 A1* | 10/2011 | Kuznetsov ............. G09B 5/125 |
| | | 701/533 |
| 2013/0066470 A1* | 3/2013 | Wang ................... H04L 12/2825 |
| | | 700/275 |
| 2014/0313014 A1 | 10/2014 | Huh et al. |
| 2017/0083933 A1* | 3/2017 | Sakurai ............. G01C 21/3697 |
| 2018/0027090 A1* | 1/2018 | Nakanishi ............... H04L 67/22 |
| | | 709/206 |
| 2019/0035251 A1* | 1/2019 | Lim ........................ G08B 21/12 |

FOREIGN PATENT DOCUMENTS

| | | |
|---|---|---|
| JP | 2006-92017 A | 4/2006 |
| JP | 2008-305190 A | 12/2008 |
| JP | 2010-133913 A | 6/2010 |
| JP | 2010-191487 | 9/2010 |
| JP | 2011-8457 A | 1/2011 |
| JP | 2012-14602 | 1/2012 |
| JP | 2013-85177 | 5/2013 |
| JP | 2015-4921 A | 1/2015 |
| JP | 2015-60355 | 3/2015 |

* cited by examiner

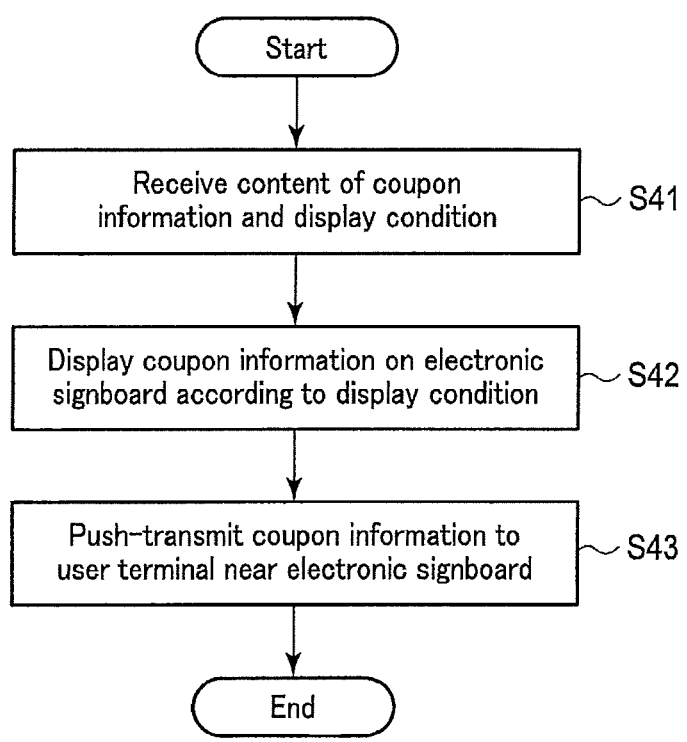
F I G. 6

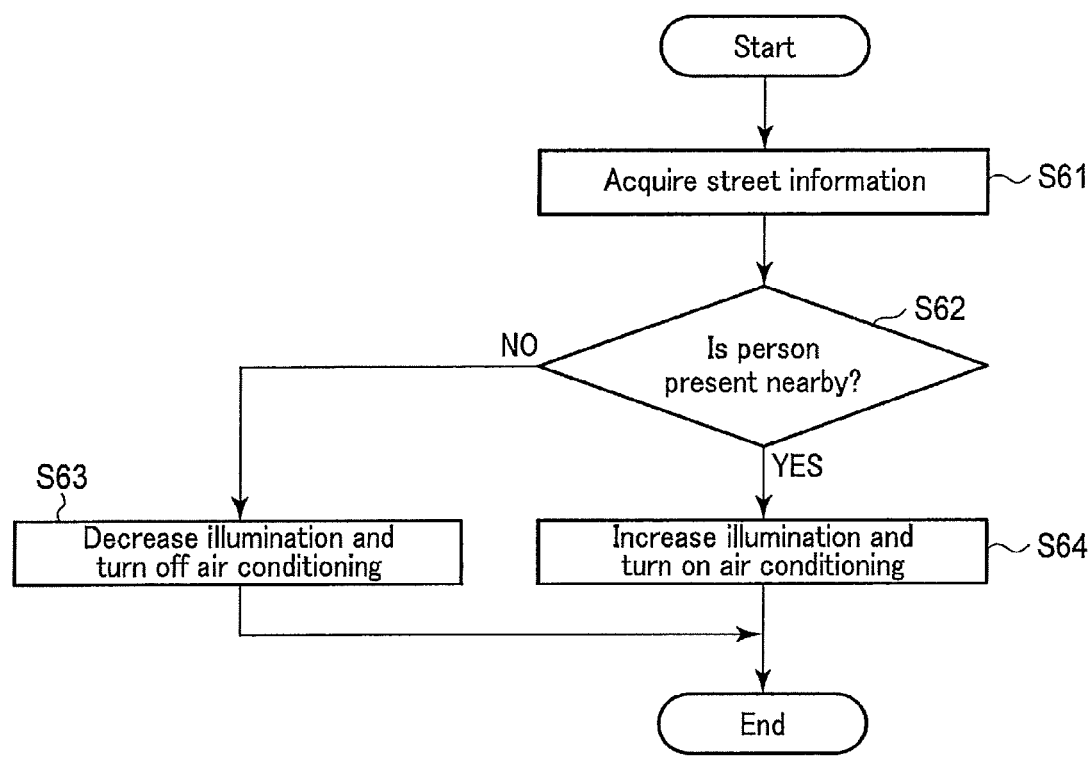
F I G. 8

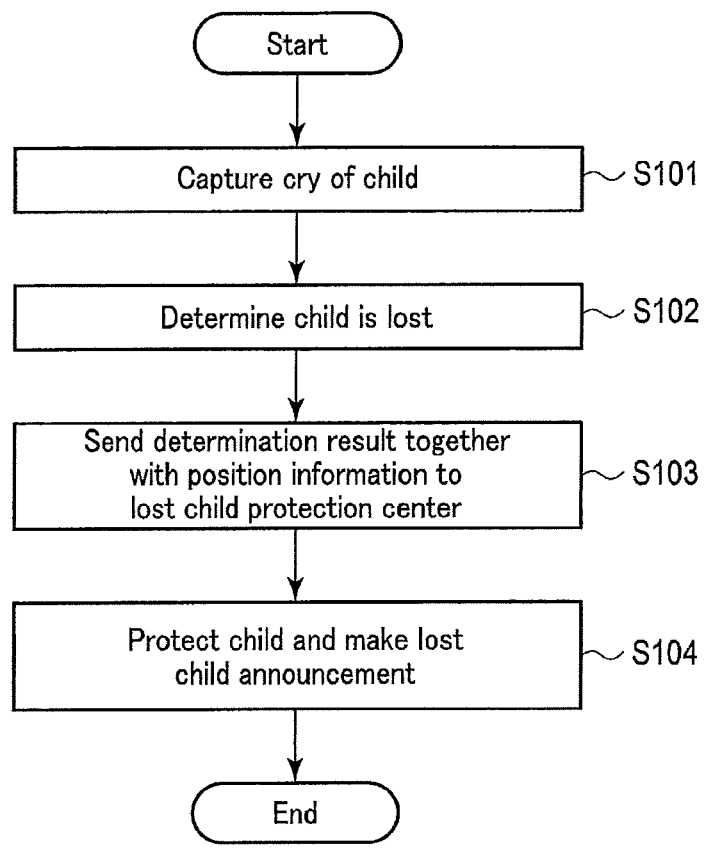
F I G. 12

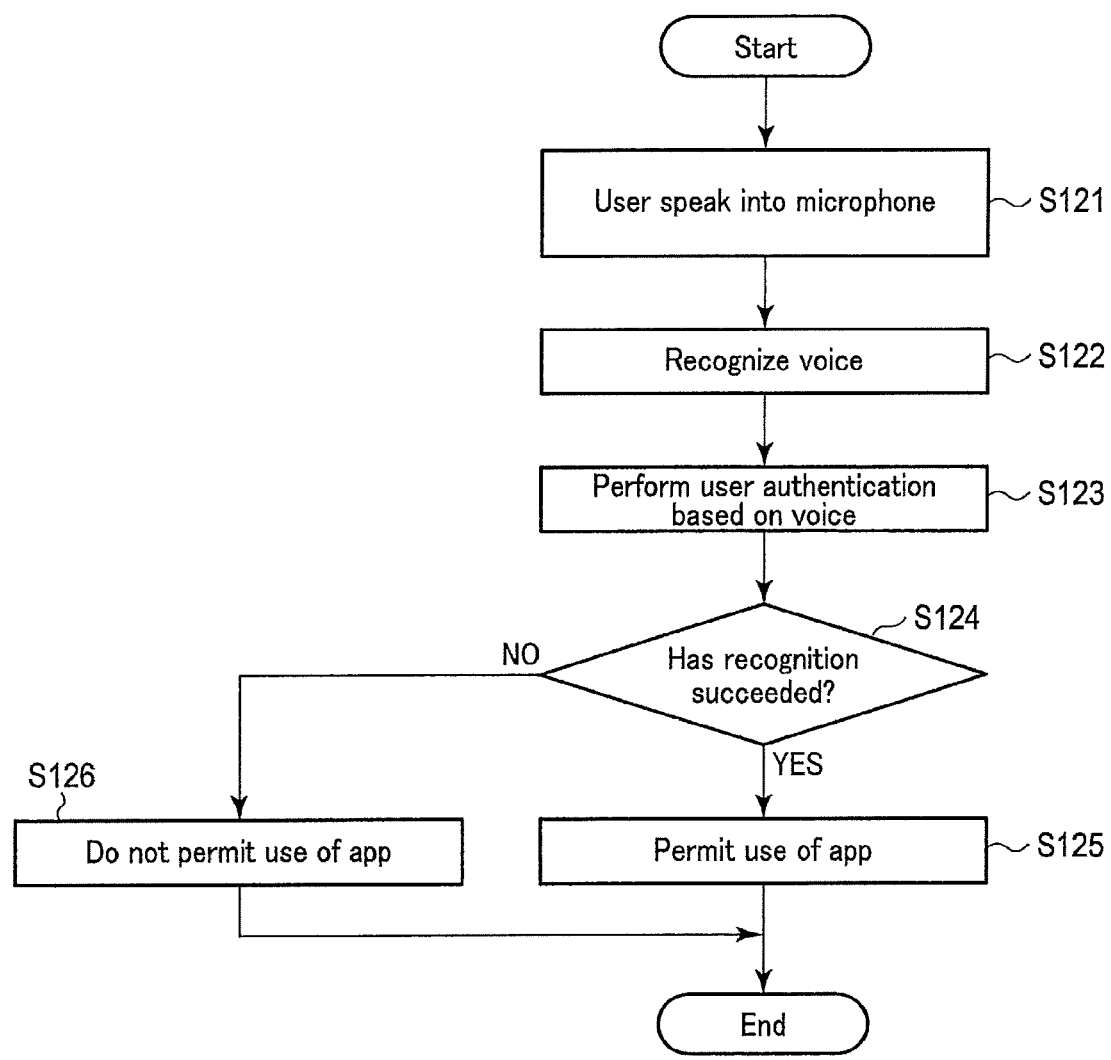
F I G. 14

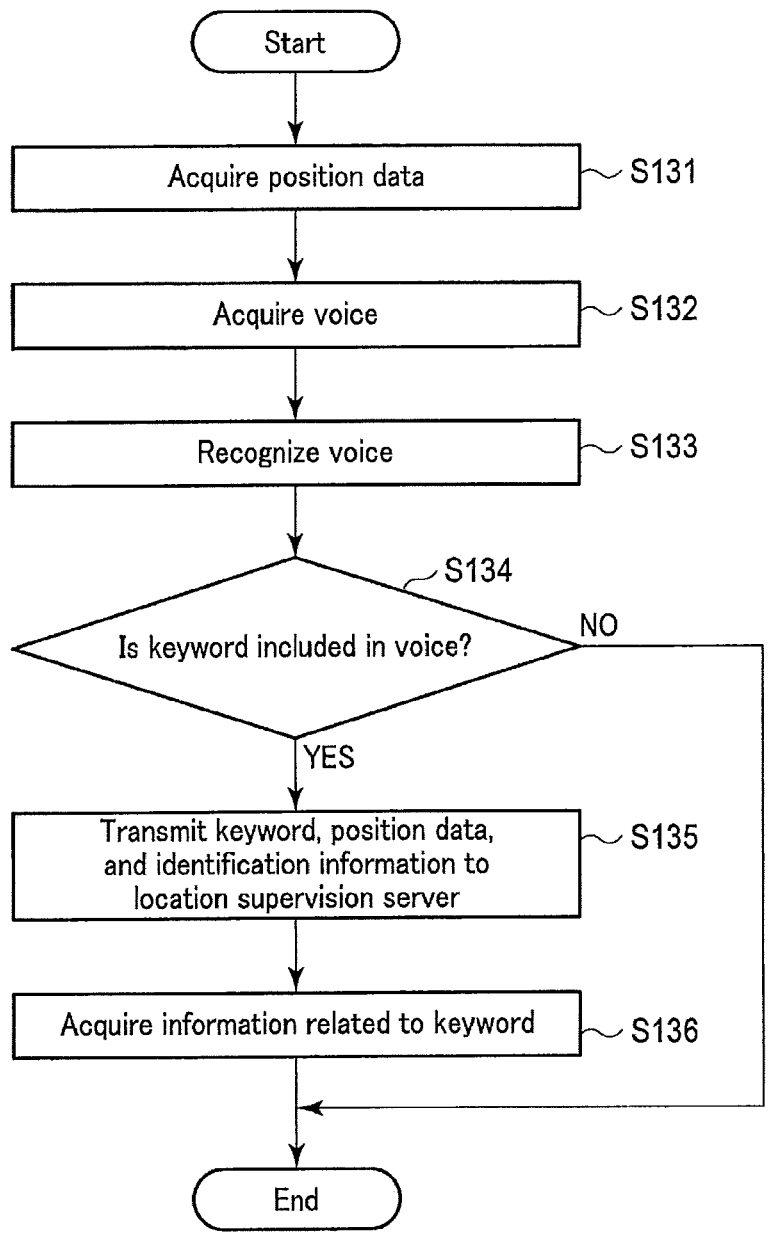
F I G. 15

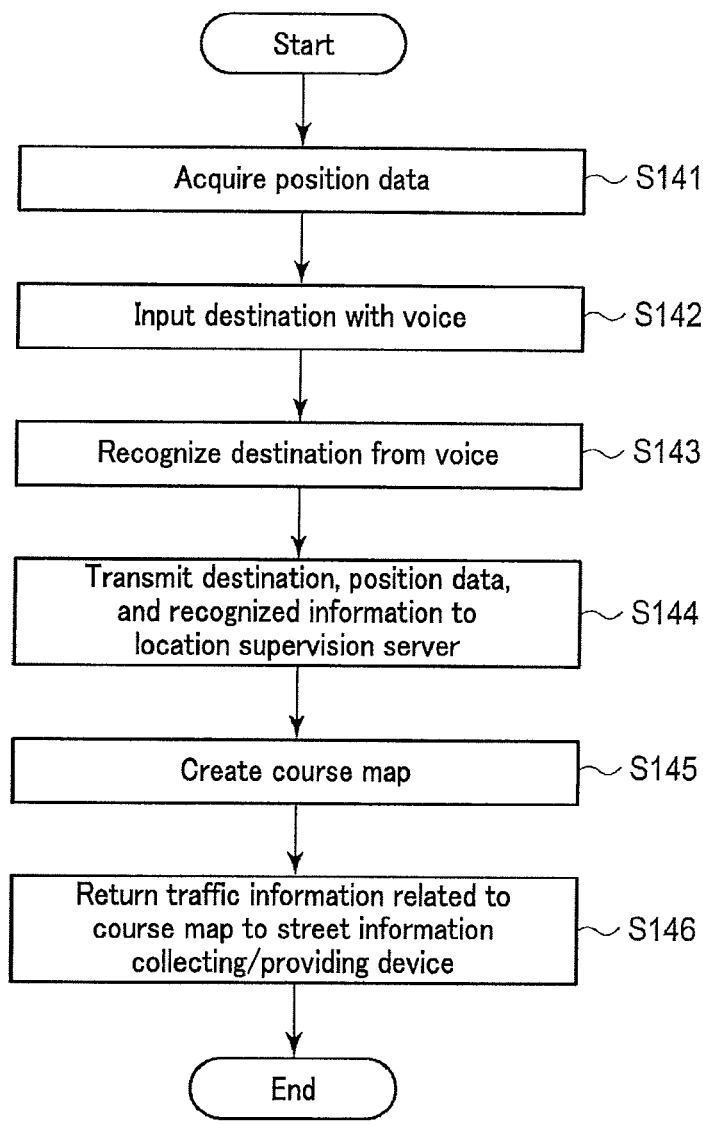
F I G. 16

STREET INFORMATION PROCESSING SYSTEM, CLIENT AND SERVER APPLIED TO STREET INFORMATION PROCESSING SYSTEM, AND METHOD AND PROGRAM OF THE SAME

CROSS-REFERENCE TO RELATED APPLICATIONS

This application is a Continuation Application of PCT Application No. PCT/JP2016/076976, filed Sep. 13, 2016 and based upon and claiming the benefit of priority from Japanese Patent Application No. 2015-184817, filed Sep. 18, 2015, the entire contents of all of which are incorporated herein by reference.

FIELD

Embodiments described herein relate to a street information processing system including a plurality of clients arranged on the street in a distributed manner and functioning as a street information collecting/providing device, and a server communicatively connected with the plurality of clients via a communication network, the above-described client and server, and a method and a program of the same.

BACKGROUND

In recent years, spread of electronic signboards for displaying various kinds of electronic information on the streets such as digital signage terminal has been in progress. Further, there are also an electronic signboard provided in a vending machine and which displays character information, and an electronic signboard for presenting various types of information in a vehicle such as a bullet train, in addition to the electronic signboard arranged on the street.

This type of electronic signboard is typically connected to a communication network, acquires presentation condition information such as a presentation time zone and the number of times of presentation from a management server via the communication network, and displays content according to the presentation condition information.

By arranging this type of electronic signboard throughout vehicles and streets in a distributed manner, highly effective information is selectively displayed according to time and place, thereby effective information can be provided to viewers.

For example, by arranging this type of electronic signboard in department stores, shopping malls, and the like, guidance for sale and the like is effectively performed according to time and place for sales promotion.

Discount sales and notice of campaigns are also performed from an electronic signboard installed in vending machines and are used for sales promotion.

Further, on an electronic signboard installed in train vehicles, usually stop stations, time required, a next stop station, weather information, and the like are displayed. In a case of a delay in operation due to an accident or the like, delay information is displayed. A vehicle displaying such delay information is a delayed vehicle and a vehicle affected by the delay, and a vehicle on a course not affected by the delay does not display the delay information and displays usual information. The display content is customized for each vehicle.

Further, in recent years, with the explosive popularization of smart phones and tablets, transmission of information that is more timely and specialized for individual needs has been made by a cooperation of the electronic signboard and the mobile terminals such as smartphones and tablets.

For example, a user, who is interested in the content displayed on the digital signage and wishes to have further detailed information, reads a QR code (registered trademark) placed in the content or near the digital signage with a smart phone or a tablet and accesses a special URL, or receives information communicated by the digital signage by Bluetooth (registered trademark) with the smart phone or a tablet using a special app to acquire the detailed information.

BRIEF DESCRIPTION OF THE DRAWINGS

FIG. 6 is a flowchart illustrating an operation example of when content is displayed from an electronic signboard and/or a user by a street information collecting/providing device of a street information processing system according to a second embodiment.

FIG. 8 is a flowchart illustrating an operation example in an application example of a street information processing system according to a fourth embodiment to infrastructure control.

FIG. 12 is a flowchart illustrating an operation example in a lost child finding service.

FIG. 14 is a flowchart illustrating an operation example at the time of user authentication of a street information processing system according to a fifth embodiment.

FIG. 15 is a flowchart illustrating an operation example of a map information acquisition function of the street information processing system according to the fifth embodiment.

FIG. 16 is a flowchart illustrating an operation example of a course search function of the street information processing system according to the fifth embodiment.

DETAILED DESCRIPTION

Embodiments will be described with reference to the drawings.

In general, according to one embodiment, there is provided a street information processing system including a plurality of clients arranged on the streets in a distributed manner and a server communicably connected to the plurality of clients via a communication network.

A client includes a street information collection unit for collecting street information near an arrangement place, a provision determination unit for determining whether the street information collected by the street information collection unit is information required to be provided to the server, and a first transmission unit for transmitting the street information, which is determined to be required to be provided by determination of the provision determination unit, to the server, with client identification information for identifying the client.

A server includes an analysis unit for analyzing the street information transmitted by the first transmission unit, a determination unit for determining one or more clients, from among the plurality of clients, for providing information determined based on an analysis result by the analysis unit, and a second transmission unit for transmitting the information determined based on the analysis result to the one or more clients determined by the determination unit.

First Embodiment

Figure 1:
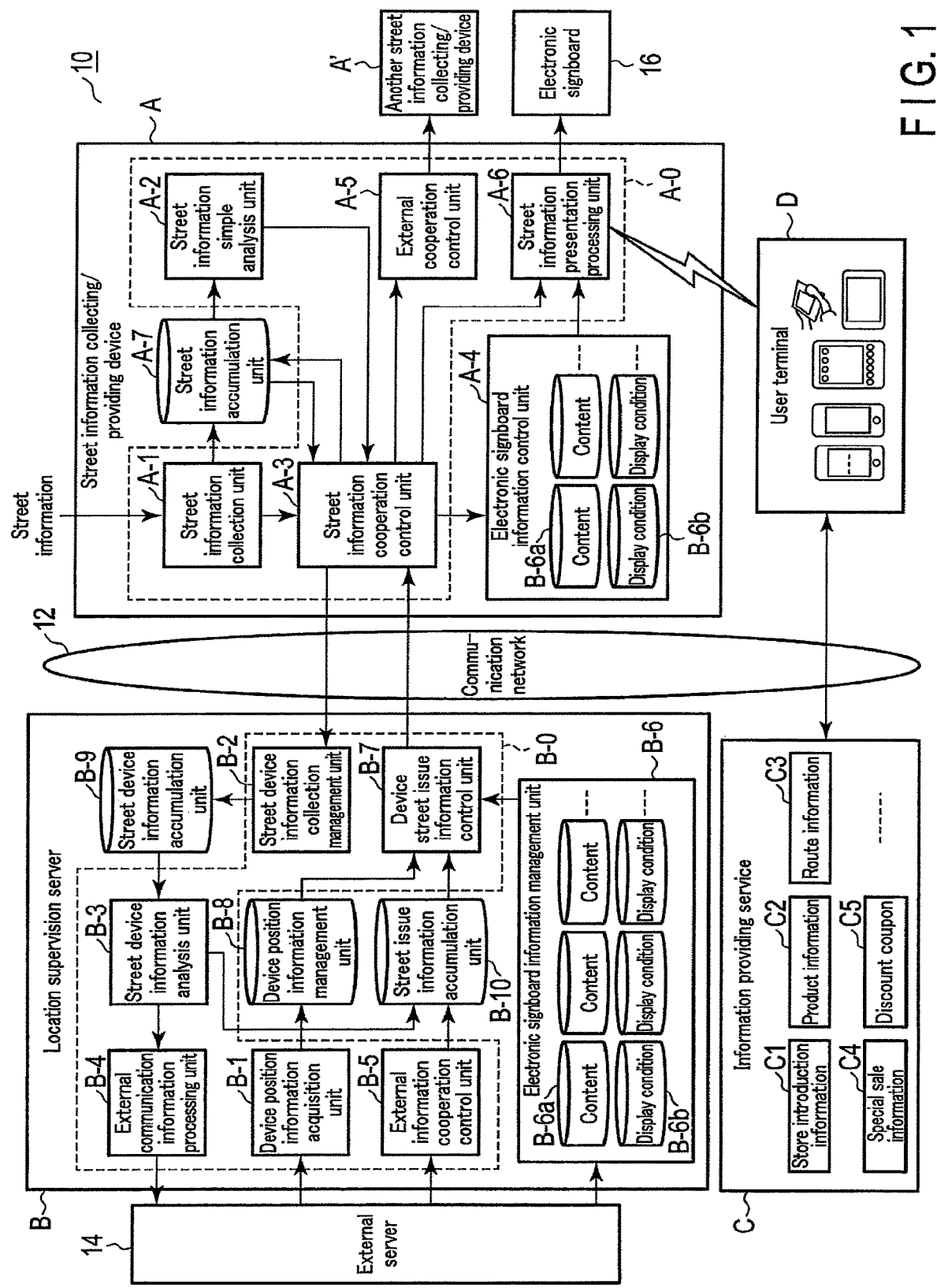
FIG. 1 is a conceptual diagram illustrating a configuration example of a street information processing system according to a first embodiment.

FIG. 1 is a conceptual diagram illustrating a configuration example of a street information processing system according to a first embodiment.

A street information processing system 10 according to the present embodiment includes a plurality of clients (hereinafter referred to as "street information collecting/providing device A") arranged on the streets in a distributed manner, and a server (hereinafter referred to as "location supervision server B") communicatively connected with the plurality of street information collecting/providing devices A via a public line such as the Internet or a communication network 12 as a special line.

Further, the communication network 12 can be connected with a known user terminal D having a wired communication function or a wireless communication function such as Bluetooth, LTE (registered trademark), Wi-Fi (registered trademark), Wi-SUN, or IR, such as a smart phone, a tablet, a PC, or a car navigation, or a known typical information providing service C accessible by the user terminal D by designation of a URL. The information providing service C includes, for example, store introduction information C1, product information C2, route information C3, special sale information C4, and discount coupon information C5.

Note that such a communication network 12 includes a LAN such as Ethernet (registered trademark), or a WAN in which a plurality of LANs is connected via a public line or a dedicated line as needed. In the case of LAN, the communication network 12 includes a large number of subnets via routers as needed. In the case of WAN, the communication network 12 includes a firewall or the like for being connected to the public line as appropriate. However, here, illustration and detailed description of the firewall or the like are omitted.

The street information collecting/providing device A includes a street information collection unit A-1, a street information simple analysis unit A-2, a street information cooperation control unit A-3, an electronic signboard information control unit A-4, an external cooperation control unit A-5, a street information presentation processing unit A-6, and a street information accumulation unit A-7.

The street information collection unit A-1, the street information simple analysis unit A-2, the street information cooperation control unit A-3, the external cooperation control unit A-5, and the street information presentation processing unit A-6 configure a processing unit A-0.

Although not illustrated, the processing unit A-0 includes, for example, a central processing unit (CPU), a read only memory (ROM) and a random access memory (RAM) for storing application programs and data for the CPU to execute processing, and the like. The processing unit A-0 causes the CPU to execute an application program stored in the ROM (not illustrated) using the RAM (not illustrated) to realize the street information collection unit A-1, the street information simple analysis unit A-2, the street information cooperation control unit A-3, the external cooperation control unit A-5, and the street information presentation processing unit A-6.

Note that the case where the processing unit A-0 includes the CPU has been described as an example. However, the embodiment is not limited to the example, and the processing unit A-0 may include a field programmable gate array (APGA), and the like to realize the street information collection unit A-1, the street information simple analysis unit A-2, the street information cooperation control unit A-3, the external cooperation control unit A-5, and the street information presentation processing unit A-6.

Meanwhile, the electronic signboard information control unit A-4 and the street information accumulation unit A-7 include a storage device such as a hard disk.

The location supervision server B includes a device position information acquisition unit B-1, a street device information collection management unit B-2, a street device information analysis unit B-3, an external communication information processing unit B-4, an external information cooperation control unit B-5, an electronic signboard information management unit B-6, a device street issue information control unit B-7, a device position information management unit B-8, a street device information accumulation unit B-9, and a street issue information accumulation unit B-10.

Among them, the device position information acquisition unit B-1, the street device information collection management unit B-2, the street device information analysis unit B-3, the external communication information processing unit B-4, the external information cooperation control unit B-5, and the device street issue information control unit B-7 configures a processing unit B-0.

Although not illustrated, the processing unit B-0 also includes, for example, a central processing unit (CPU), a read only memory (ROM) and a random access memory (RAM) for storing application programs and data for the CPU to execute processing, and the like. The processing unit B-0 causes the CPU to execute an application program stored in the ROM (not illustrated) using the RAM (not illustrated) to realize the device position information acquisition unit B-1, the street device information collection management unit B-2, the street device information analysis unit B-3, the external communication information processing unit B-4, the external information cooperation control unit B-5, and the device street issue information control unit B-7.

Note that the case where the processing unit B-0 includes the CPU has been described as an example. However, the embodiment is not limited to the example, and the processing unit B-0 may include a field programmable gate array (APGA), and the like to realize the device position information acquisition unit B-1, the street device information collection management unit B-2, the street device information analysis unit B-3, the external communication information processing unit B-4, the external information cooperation control unit B-5, and the device street issue information control unit B-7.

Meanwhile, the electronic signboard information management unit B-6, the device position information management unit B-8, the street device information accumulation unit B-9, and the street issue information accumulation unit B-10 include a storage device such as a hard disk.

The street information collection unit A-1 collects the street information near the arrangement place of the street information collecting/providing device A. For example, the street information includes various kinds of localized information which are exchanged via an electronic signboard in the city. The street information collection unit A-1, to be specific, includes an external input terminal such as a USB terminal, and collects the street information from, for example, at least any of street information acquisition means including a user terminal, a camera, a microphone, a human sensor, an object detection sensor, an air temperature sensor, an inertia sensor, an acceleration sensor, a vibration sensor, a rainfall sensor, a moisture content sensor, a light and dark sensor, a GPS, and a gas/liquid/solid component sensor, and adds collection time information to the collected street information, which is connected to the external input terminal. However, the street information is not limited thereto.

The street information includes at least any of data acquired by the user terminal, image data photographed by the camera, sound data acquired by the microphone, sensing data acquired by the human sensor, detection data acquired by the object detection sensor, temperature data acquired by the air temperature sensor, inertia data acquired by the inertia sensor, acceleration data acquired by the acceleration sensor, vibration data acquired by the vibration sensor, rainfall data acquired by the rainfall sensor, moisture content data acquired by the moisture content sensor, light and dark data acquired by the light and dark sensor, position data acquired by the GPS, component data acquired by the gas/liquid/solid component sensor. However, the street information is not limited thereto.

The street information collection unit A-1 further adds collection time information, client identification information for identifying the street information collecting/providing device A, and street information acquisition means identification information for identifying the street information acquisition means to the collected street information. Then, the collected street information is accumulated together with the corresponding identification information in the street information accumulation unit A-7. As for preset street information, some or all of the preset street information is output to the street information cooperation control unit A-3 without being accumulated in the street information accumulation unit A-7. Note that, prior to accumulation to the street information accumulation unit A-7 or prior to output to the street information cooperation control unit A-3, optimization according to various types of input information may be performed for the street information as needed, such as noise removal of luminance and color difference and compression in the case of an image, and noise removal and compression in the case of a sound.

Note that the street information acquisition means identification information is uniquely assigned to each street information acquisition means. Therefore, for example, when pieces of street information are acquired by a plurality of user terminals, user terminal identification information of the user terminal as the acquisition source is added to each of these pieces of street information.

The street information simple analysis unit A-2 determines whether the street information collected by the street information collection unit A-1 is information required to be provided to the location supervision server B. For example, to determine whether the street information collected by the street information collection unit A-1 is information required to be provided to the location supervision server B, the street information simple analysis unit A-2 compares the street information with a threshold or a characteristic set according to the street information acquisition means as an acquisition source, and analyzes whether the street information exceeds the threshold or corresponds to the characteristic. Then, when the street information exceeds the threshold or corresponds to the characteristic, the street information simple analysis unit A-2 transmits the analysis result and some or all of the street information to the street information cooperation control unit A-3.

For example, when the street information acquisition means is a camera, the number of faces photographed in an image by the camera is set as the threshold. Alternatively, the number of faces recognized within a unit time designated in advance is set as the threshold. For this purpose, the street information simple analysis unit A-2 performs recognition of persons photographed in the image, and determines the number of faces based on the recognition result. When the number exceeds the threshold, such as 50 persons or 100 persons in 10 minutes, the street information simple analysis unit A-2 transmits the corresponding image to the street information cooperation control unit A-3.

When the street information acquisition means is a microphone, the threshold value is set to an appropriate value (dB). With the setting, when a large voice exceeding the threshold is acquired by the microphone, such as "help!", it is a possibility of information for notifying a state of emergency. Therefore, the street information simple analysis unit A-2 sends the voice exceeding the threshold to the street information cooperation control unit A-3.

When the street information acquisition means is a human sensor, the threshold is set to an appropriate value, and the street information simple analysis unit A-2 sends a detection result exceeding the threshold to the street information cooperation control unit A-3.

When the street information acquisition means is an object detection sensor, the threshold is set to an appropriate value, and the street information simple analysis unit A-2 sends a detection result exceeding the threshold to the street information cooperation control unit A-3.

When the street information acquisition means is an air temperature sensor, the threshold is set to, for example, 35° C. With the setting, when the temperature measured by the air temperature sensor exceeds 35° C., the air temperature is abnormally high. Therefore, the street information simple analysis unit A-2 sends the measured temperature to the street information cooperation control unit A-3. Alternatively, the threshold of the air temperature sensor is set to, for example, 60° C. Normally, the air temperature does not rise to such a temperature, and thus if the temperature measured by the air temperature sensor exceeds 60° C., there is a possibility of occurrence of a fire in the neighborhood. Therefore, the street information simple analysis unit A-2 sends the measured temperature to the street information cooperation control unit A-3. Alternatively, a temperature increase rate or a temperature decrease rate may be set as the threshold.

When the street information acquisition means is an inertia sensor, the threshold is set to an appropriate value, and the street information simple analysis unit A-2 sends a detection result exceeding the threshold to the street information cooperation control unit A-3.

Further, when the street information acquisition means is an acceleration sensor, the threshold is set to an appropriate value (Gal). When acceleration exceeding this threshold is detected, there is a possibility of occurrence of an earthquake. Therefore, the street information simple analysis unit A-2 sends detected acceleration to the street information cooperation control unit A-3.

Further, when the street information acquisition means is a vibration sensor, the threshold is set to an appropriate value (Hz). When a frequency exceeding this threshold is detected, there is a possibility of occurrence of strong winds due to typhoons, tornadoes, or the like. Therefore, the street information simple analysis unit A-2 sends the detected frequency to the so the street information simple analysis unit A-2 converts the detected frequency into the street information cooperation control unit A-3.

Further, when the street information acquisition means is a rainfall sensor, the threshold is set to an appropriate value (mm/hr). When rainfall exceeding this threshold is detected, there is a possibility of severe rain such as Guerrilla rainstorm. Therefore, the street information simple analysis unit A-2 sends the detected rainfall to the street information cooperation control unit A-3.

Further, when the street information acquisition means is a moisture content sensor, the threshold is set to an appropriate value (VWC) (volume content). When the moisture content sensor is used together with the above-described rainfall sensor, for example, when the moisture content exceeding the threshold is detected although the rainfall is not detected by the rainfall sensor, there is a possibility of occurrence of tsunami or flood of river. Therefore, the street information simple analysis unit A-2 sends the detected moisture content to the street information cooperation control unit A-3.

When the street information acquisition means is a light and dark sensor, the threshold is set to an appropriate value (lux). When brightness exceeding the threshold is detected, there is a possibility of occurrence of lightning strike in the neighborhood. Therefore, the street information simple analysis unit A-2 sends the detected brightness to the street information cooperation control unit A-3. Alternatively, the threshold value is set to a low value and brightness darker than the threshold is detected at night, there is a possibility of occurrence of power failure. Therefore, the street information simple analysis unit A-2 sends the detected brightness to the street information cooperation control unit A-3.

When the street information acquisition means is a GPS, the threshold is set to an appropriate value, and the street information simple analysis unit A-2 sends position information exceeding the threshold to the street information cooperation control unit A-3.

Further, when the street information acquisition means is a gas/liquid/solid component sensor, the threshold value is set to an appropriate value ($\mu g/m^3$) of the concentration of PM 2.5, for example. When the concentration exceeding the threshold is detected, there is a possibility of high level of PM2.5. Therefore, the street information simple analysis unit A-2 sends the detected concentration of PM2.5 to the street information cooperation control unit A-3.

Further, as an example of the characteristic, when a camera is used as the street information acquisition means, the characteristic corresponds to a direction to which a person goes, a place where a person stays, and the like. For example, when an image indicating that the direction to which a person goes is from the north to the south, or an entrance of a certain building is dense with people is photographed, the street information simple analysis unit A-2 sends the corresponding image to the street information cooperation control unit A-3.

As another example of the characteristic, when a microphone is used as the street information acquisition means, the characteristic corresponds to a keyword included in a voice acquired by the microphone. For example, when a preset keyword such as "help!" is included in the voice acquired by the microphone, the street information simple analysis unit A-2 sends the voice to the street information cooperation control unit A-3.

The threshold and the characteristic are not limited thereto, and can also be arbitrarily combined and used. In the embodiments described below, other specific thresholds, characteristics, and examples of combinations are described.

The street information cooperation control unit A-3 functions as a transmission unit that transmits the street information determined to be required to be provided by the determination of the street information simple analysis unit A-2 to the location supervision server B together with the client identification information. At this time, data processing, optimization, and encryption according to the location supervision server B are performed for the street information as needed, and the street information is transmitted. The street information cooperation control unit A-3 also functions as a reception unit that receives the information transmitted from the location supervision server B. That is, the street information cooperation control unit A-3 acquires the information transmitted from the location supervision server B, and transmits the information to any of the street information accumulation unit A-7, the electronic signboard information control unit A-4, the external cooperation control unit A-5, and the street information presentation processing unit A-6 according to the acquired content. At this time, at least a reception time is added to the information, and the identification information of the location supervision server is added as needed and transmitted. In addition, the information may be transmitted after optimization such as processing is performed for the information as needed.

The device position information acquisition unit B-1 can communicate with an external server 14 connected via a communication network (not illustrated). This communication network includes a public line or a dedicated line, as described above, and includes a LAN such as Ethernet (registered trademark), or a WAN in which a plurality of LANs is connected via the public line or the dedicated line as needed. Then, in the case of LAN, the communication network includes a large number of subnets via routers as needed. In the case of WAN, the communication network includes a firewall or the like for being connected to the public line as appropriate. However, here, illustration and detailed description of the firewall or the like are omitted.

The external server 14 stores position information of a plurality of street information collecting/providing devices A in advance.

The device position information acquisition unit B-1 acquires the position information of the plurality of street information collecting/providing devices A from the external server 14. Then, the acquired position information is accumulated in the device position information management unit B-8. At this time, information such as the identification information of the street information collecting/providing device A, issuable and acquirable data types, and the like are accumulated in addition to the position information (for example, latitude/longitude, ±dd.mm.ss.sss) in the device position information management unit B-8.

The street device information collection management unit B-2 acquires the street information and the identification information transmitted by the street information cooperation control unit A-3, and accumulates the street information and the identification information together with acquisition time information indicating an acquired time in the street device information accumulation unit B-9 The identification information and the acquisition time information accumulated in the street device information accumulation unit B-9 are used together with street information accumulated in the street apparatus information storage section B-9, for an analysis performed by the street device information analysis unit B-3.

The street apparatus information analyzing section B-3 analyzes the street information accumulated in the street device information accumulation unit B-9. Specifically, the street apparatus information analyzing section B-3 compares the street information accumulated in the street device information accumulation unit B-9 with a threshold or a characteristic set according to the corresponding client based on the client identification information. Then, an analysis for determining whether the street information exceeds the threshold or corresponds to the characteristic is performed. Then, when an analysis result showing that the street information exceeds the threshold or corresponds to the characteristic is obtained, some or all of analysis information is accumulated in the street issue information accumulation unit B-10. Also, some or all of the analysis information is transmitted to the external communication information processing unit B-4 according to the content acquired from the street device information collection management unit B-2 via the street device information accumulation unit B-9.

The street device information analysis unit B-3 can analyze the street information from a different perspective from the street information simple analysis unit A-2 by applying different threshold value and characteristic to those applied in the street information simple analysis unit A-2.

The external communication information processing unit B-4 transmits some or all of the analysis information together with server identification information for identifying the location supervision server B to the external server 14 determined in advance according to the analysis result. Note that, in sending the information, data processing, optimization, and encryption may be performed as needed.

The external information cooperation control unit B-5 acquires the external server provided information provided from the external server 14 according to the analysis information and the server identification information transmitted to the external server 14 by the external communication information processing unit B-4. The external information cooperation control unit B-5 further accumulates the external server provided information together with an acquisition time when the external server provided information has been acquired and external server identification information for identifying the external server 14 in the street issue information accumulation unit B-10. Note that, in accumulating the information, optimization such as data processing may be performed as needed.

The device street issue information control unit B-7 determines one or more street information collecting/providing devices A, from among the plurality of street information collecting/providing devices A, for providing the information determined based on of the analysis result by the street device information analysis unit B-3. Then, the information determined based on the analysis result is transmitted together with at least the server identification information to the determined one or more street information collecting/providing devices A. Note that, in transmitting the information, data processing, optimization, and encryption according to the street information collecting/providing device A may be performed as needed.

The information transmitted by the device street issue information control unit B-7 in this manner is displayed on the electronic signboard 16 by control of the street information presentation processing unit A-6.

The electronic signboard information management unit B-6 stores content B-6a and a display condition B-6b acquired from the external server 14 by an operation by an administrator. Note that necessary processing may be made as needed prior to the storage. The content B-6a is displayed on the electronic signboard 16 and the display condition B-6b is definition of a time to display the content on the electronic signboard 16, a display pattern, the number of time, and the like, and are acquired by the device street issue information control unit B-7 as needed, transmitted from the device street issue information control unit B-7 to the street information cooperation control unit A-3, further sent from the street information cooperation control unit A-3 to the electronic signboard information control unit A-4, and stored. The content and the display condition stored in the electronic signboard information control unit A-4 in this manner are acquired by the street information presentation processing unit A-6, and the content is displayed on the electronic signboard 16 according to the display condition.

The street information presentation processing unit A-6 causes the electronic signboard 16 to display some or all of the content according to the display condition. Alternatively, the user terminal D can display the content. At the time of display, the client identification information may be added, and data processing, optimization, and encryption according to presentation equipment such as a video panel, or a speaker, or the user terminal D such as a smartphone, a tablet, a PC, or a car navigation may be performed, as needed. In communication to the user terminal D, wired means or a wireless standard such as Bluetooth, LTE, Wi-Fi, Wi-SUN, or IR is used.

The content and the display condition stored in the electronic signboard information management unit B-6 can be registered, changed, and deleted by a predetermined administrator. Further, the display condition includes at least the time of display of the content, the display pattern, and the number of times of display.

The street issue information accumulation unit B-10 further accumulates the external server provided information provided from the external server 14, the acquisition time when the external server provided information has been acquired, and the external server identification information for identifying the external server 14 in association with one another.

The device street issue information control unit B-7 transmits some or all of, except the server identification information, the information accumulated in the electronic signboard information management unit B-6, the device position information management unit B-8, and the street issue information accumulation unit B-10, together with the server identification information, to the determined one or more street information collecting/providing devices A.

The street information presentation processing unit A-6 also transmits the information transmitted from the device street issue information control unit B-7 to the user terminal D by wireless communication.

Further, the content and display condition stored in the electronic signboard information management unit B-6 are transmitted by the device street issue information control unit B-7 and received by the street information cooperation control unit A-3. The display condition is further sent from the street information cooperation control unit A-3 to the electronic signboard information control unit A-4. The electronic signboard information control unit A-4 stores the display condition after performing appropriate processing as needed. The electronic signboard information control unit A-4 acquires corresponding content from the stored content according to the display condition (for example, the display time, the display pattern, and the number of times of display), and transmits the content to the street information presentation processing unit A-6. Note that, when communication disconnection, power cutoff, evacuation guidance, warning information, or the like exists in the display condition, content corresponding to the display condition is acquired from the stored content and is preferentially transmitted to the street information presentation processing unit A-6.

The street information presentation processing unit A-6 causes the user terminal D to display the content transmitted from the electronic signboard information control unit A-4 according to the display condition.

The external cooperation control unit A-5 cooperatively controls another street information collecting/providing device A' based on the information transmitted by the device street issue information control unit B-7. At this time, information is acquired from the street information cooperation control unit A-3, the client identification information is added to some or all of the information as needed, and, for example, data processing, optimization, encryption according to the external cooperative device such as another street information collecting/providing device A' are performed, and the information is issued to the external cooperative device such as the another street information collecting/providing device A' Then, instruction information for gradual cooperative control according to the external cooperative device is transmitted according to the information acquired from the street information cooperation control unit A-3. For example, as an example of the cooperative control, there is control for lighting streetlights in the neighborhood at slightly different times. As communication means for cooperatively controlling the external cooperative device, wired means or a wireless standard such as Bluetooth, LTE, Wi-Fi, Wi-SUN, or IR is used.

The street information processing system 10 configured as described above is realized when the street information collecting/providing device A and the location supervision server B reads the program recorded in a recording medium such as a magnetic disk or the program downloaded via the Internet, and the operation is controlled by the program.

Next, an operation of the street information processing system according to the first embodiment configured as described above will be described.

Figure 2:
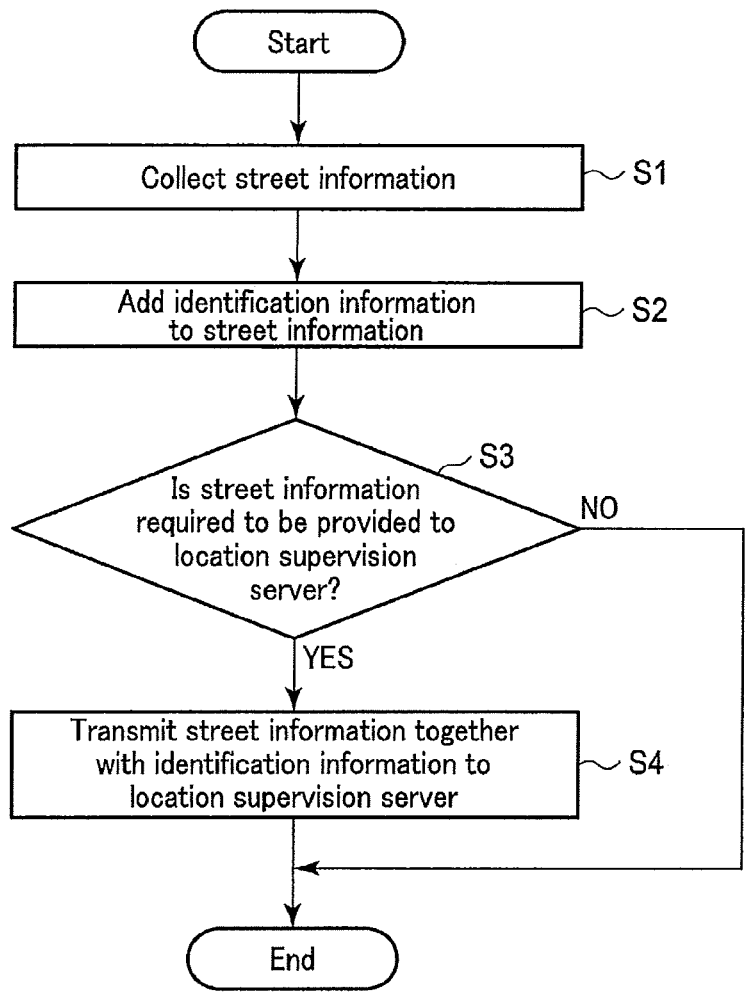
FIG. 2 is a flowchart illustrating an operation example at the time of street information collection performed in a street information collecting/providing device of the street information processing system according to the first embodiment.

First, an operation at the time of street information collection performed in the street information collecting/providing device A will be described with reference to the flowchart in FIG. 2.

That is, according to the street information processing system 10 of the present embodiment, the street information collecting/providing device A collects the street information near the arrangement place (S1). To be specific, the street information collection unit A-1 includes an external input terminal such as a USB terminal, and collects the street information from, but not limited to, at least any of street information acquisition means including a user terminal, a camera, a microphone, a human sensor, an object detection sensor, an air temperature sensor, an inertia sensor, an acceleration sensor, a vibration sensor, a rainfall sensor, a moisture content sensor, a light and dark sensor, a GPS, and a gas/liquid/solid component sensor, and adds collection time information to the collected street information, which is connected through the external input terminal.

The street information collection unit A-1 further uniquely adds the collection time information, the client identification information for identifying the street information collecting/providing device A, and the street information acquisition means identification information for identifying the street information acquisition means to the collected street information for each street information acquisition means (S2). The street information is accumulated together with the corresponding identification information in the street information accumulation unit A-7. As for preset street information, some or all of the preset street information is output to the street information cooperation control unit A-3 without being accumulated in the street information accumulation unit A-7. Note that, prior to accumulation to the street information accumulation unit A-7 or prior to output to the street information cooperation control unit A-3, the optimization according to various types of input information is performed for the street information as needed, such as noise removal of luminance and color difference and compression in the case of an image, and noise removal and compression in the case of a sound.

Next, the street information simple analysis unit A-2 determines whether the street information is information required to be provided to the location supervision server B (S3). For this purpose, for example, the street information simple analysis unit A-2 compares the street information with a threshold or a characteristic set according to the street information acquisition means as an acquisition source, and analyzes whether the street information exceeds the threshold or corresponds to the characteristic. Then, when the street information exceeds the threshold or corresponds to the characteristic (S3: Yes), the analysis result and some or all of the street information is transmitted from the street information simple analysis unit A-2 to the street information cooperation control unit A-3.

The street information determined to be required to be provided by the determination of the street information simple analysis unit A-2 is transmitted together with the client identification information by the street information cooperation control unit A-3 to the location supervision server B via the communication network 12 (S4).

In this way, the street information collected by the street information collecting/providing device A is transmitted to the location supervision server B via the communication network 12.

Figure 3:
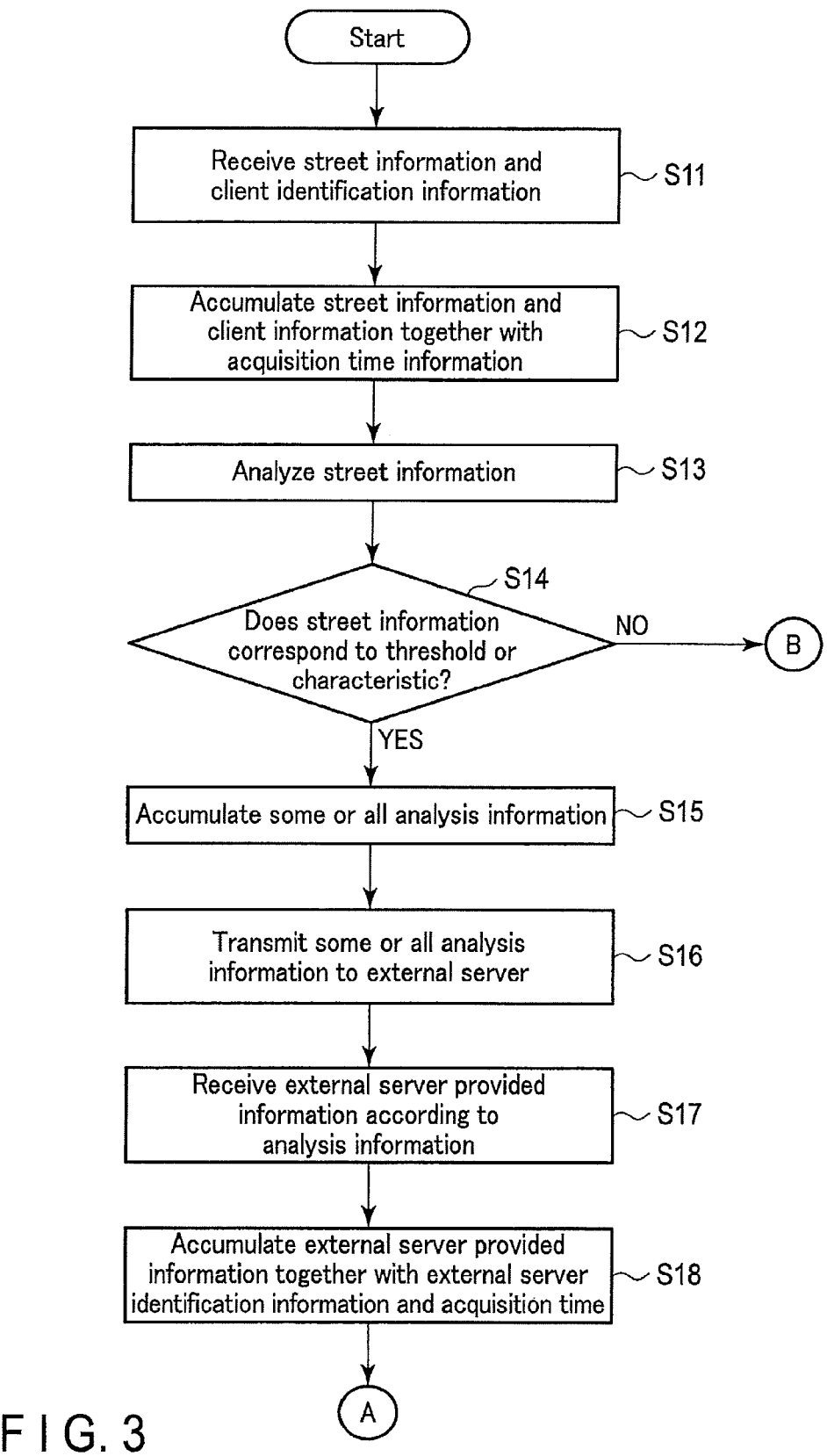
FIG. 3 is a flowchart (1/2) illustrating an operation example of when information is provided to the street information collecting/providing device by a location supervision server of the street information processing system according to the first embodiment.
Figure 4:
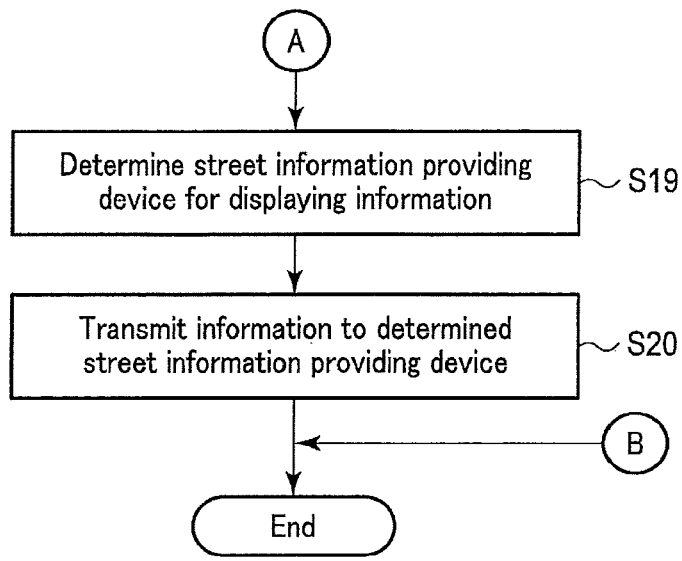
FIG. 4 is a flowchart (2/2) illustrating the operation example of when information is provided to the street information collecting/providing device by the location supervision server of the street information processing system according to the first embodiment.

Next, an operation of when information is provided to the street information collecting/providing device A by the location supervision server B will be described with reference to the flowcharts of FIGS. 3 and 4.

The street information and the client identification information transmitted by the street information cooperation control unit A-3 are received by the street device information collection management unit B-2 in the location supervision server B (S11).

The street information and the client identification information are further accumulated together with the acquisition time information indicating the time acquired by the street device information collection management unit B-2 in the street device information accumulation unit B-9 (S12).

The street information accumulated in the street device information accumulation unit B-9 is analyzed by the street device information analysis unit B-3 (S13). Specifically, the street information accumulated in the street device information accumulation unit B-9 is compared with the threshold or the characteristic set according to the corresponding client based on the corresponding client identification information in the street device information analysis unit B-3. Then, an analysis for determining whether the street information exceeds the threshold or corresponds to the characteristic is performed. Then, when an analysis result showing that the street information exceeds the threshold or corresponds to the characteristic is obtained (S14: Yes), some or all of analysis information is accumulated in the street issue information accumulation unit B-10. Also, some or all of the analysis information is transmitted from the street device information analysis unit B-3 to the external communication information processing unit B-4 according to the content acquired from the street device information collection management unit B-2 via the street device information accumulation unit B-9 (S15).

In the external communication information processing unit B-4, some or all of the analysis information is transmitted together with the server identification information for identifying the location supervision server B to the external server 14 determined in advance according to the analysis result (S16). Note that, in sending the information, data processing, optimization, and encryption are performed as needed.

The external server provided information is returned from the external server 14 according to the analysis information and the server identification information transmitted to the external server 14. The external server provided information is received by the external information cooperation control unit B-5 (S17).

The received external server provided information is accumulated together with the external server identification information for identifying the external server 14 and the acquisition time when the external server provided information has been acquired in the street issue information accumulation unit B-10 (S18).

In the device street issue information control unit B-7, one or more street information collecting/providing devices A is determined from among the plurality of street information collecting/providing devices A, for providing the information determined based on of the analysis result by the street device information analysis unit B-3 (S19). At this time, the street information collecting/providing device A is determined by reference to the information such as the position information (for example, latitude/longitude, ±dd.mm.ss.sss) of the street information collecting/providing device A, the identification information of the street information collecting/providing device A, the issuable and acquirable data types, and the like, which are stored in the device position information management unit B-8, as needed. Note that the position information of each street information collecting/providing device A is acquired from the external server 14 by the device position information acquisition unit B-1 and stored in the device position information management unit B-8.

Further, the information determined based on the analysis result is transmitted together with at least the server identification information to the determined street information collecting/providing device A by the device street issue information control unit B-7 (S20).

In this way, the necessary data according to the street information is acquired from the external server 14, and the acquired information is provided to the street information collecting/providing device A, by the location supervision server B.

Figure 5:
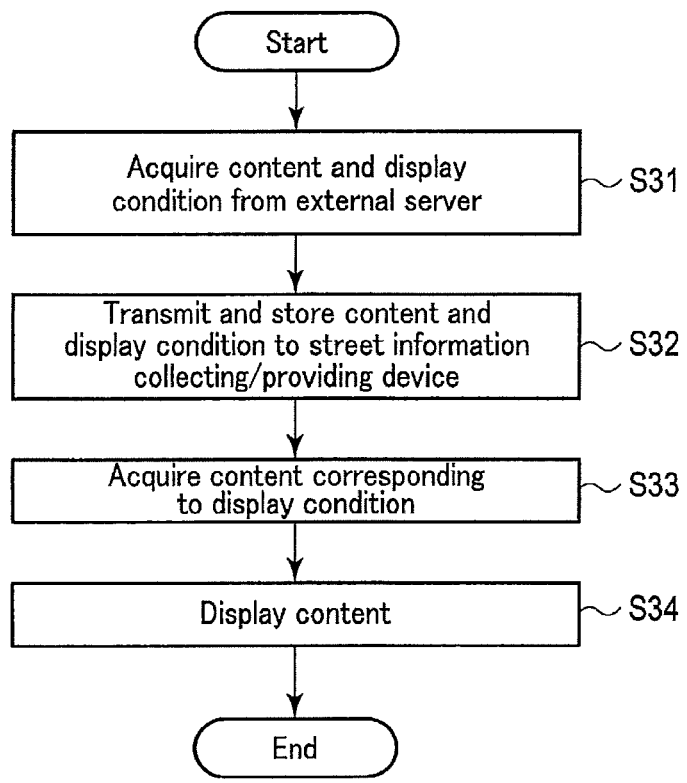
FIG. 5 is a flowchart illustrating an operation example of when content for display on an electronic signboard and/or a user terminal is provided to the street information collecting/providing device by the location supervision server of the street information processing system according to the first embodiment.

Next, an operation of when content for being displayed on the electronic signboard 16 and/or the user terminal D is provided to the street information collecting/providing device A by the location supervision server B will be described with reference to the flowchart in FIG. 5.

In the location supervision server B, the content B-6*a* and the display condition B-6*b* are acquired from the external server 14 by an operation by the administrator and are stored in the electronic signboard information management unit B-6 (S31).

The content B-6*a* and the display condition B-6*b* stored in the electronic signboard information management unit B-6 are transmitted from the device street issue information control unit B-7 to the street information cooperation control unit A-3, and are further stored from the street information cooperation control unit A-3 to the electronic signboard information control unit A-4 (S32).

In the electronic signboard information control unit A-4, the corresponding content is acquired from the stored content according to the display condition (for example, the display time, the display pattern, and the number of times of display), and is transmitted to the street information presentation processing unit A-6 (S33). Note that, when communication disconnection, power cutoff, evacuation guidance, warning information, or the like exists in the display condition, content corresponding to the display condition is acquired from the stored content and is preferentially transmitted to the street information presentation processing unit A-6.

The content transmitted to the street information presentation processing unit A-6 is further sent to the electronic signboard 16. Further, the content may be transmitted to the user terminal D instead of or in addition to the electronic signboard 16. As a result, the content is displayed on the electronic signboard 16 or on the user terminal D in addition to the electronic signboard 16 (S34).

In a case of displaying the content on the user terminal D, data processing, optimization, and encryption according to the user terminal D may be appropriately performed when transmitting the content to the user terminal D. Further, in transmission to the user terminal D, wired means or a wireless standard such as Bluetooth, LTE, Wi-Fi, Wi-SUN, or IR is used.

In this way, the content is provided to the street information collecting/providing device A, and can be displayed on the electronic signboard 16 and/or the user terminal D, by the location supervision server B.

Next, although not illustrated, an external cooperation control operation performed by the external cooperation control unit A-5 will be described.

That is, the street information collecting/providing device A according to the present embodiment can cooperatively control other street information collecting/providing devices A' by the external cooperation control unit A-5. This control is performed based on the information transmitted by the device street issue information control unit B-7 and received by the street information cooperation control unit A-3.

Specifically, the client identification information is added to some or all of the information acquired from the street information cooperation control unit A-3 by the external cooperation control unit A-5 as needed, further, data processing, optimization, encryption according to the external cooperative device such as another street information collecting/providing device A' are performed, and then the information is issued to the another street information collecting/providing device A' as instruction information. Not that instruction information for gradual cooperative control according to the external cooperative device may be transmitted according to the information acquired from the street information cooperation control unit A-3. For example, as an example of the cooperative control, there is control for lighting streetlights in the neighborhood at slightly different times. As the communication means for cooperatively controlling the external cooperative device, wired means or a wireless standard such as Bluetooth, LTE, Wi-Fi, Wi-SUN, or IR is used.

In this way, another street information collecting/providing device A' can be cooperatively controlled by the external cooperation control unit A-5.

As described above, in the street information processing system according to the present embodiment, the street information collected by the street information collecting/providing device A can be transmitted to the location supervision server B via the communication network 12 according to the above-described functions.

Further, the necessary data according to the street information can be acquired from the external server 14, and the acquired information can be provided to the street information collecting/providing device A, by the location supervision server B.

Furthermore, the content can be provided to the street information collecting/providing device A, and can be displayed on the electronic signboard 16 and/or the user terminal D, by the location supervision server B.

Furthermore, another street information collecting/providing device A' can be cooperatively controlled by the external cooperation control unit A-5.

Second Embodiment

A second embodiment of the present invention will be described.

In a street information processing system according to the second embodiment of the present invention, the street information processing system according to the first embodiment is applied for improving advertising effect and guidance to a store. Therefore, hereinafter, matters specific to the present embodiment will be described while avoiding redundant description of the portions already described in the first embodiment.

First, a configuration of a street information collecting/providing device A side will be described.

To improve the advertising effect and guidance to a store, a street information collection unit A-1 acquires data acquired at least by a camera, a microphone, and an air temperature sensor as street information, and accumulates some or all of the data in a street information accumulation A-7. Note that, in accumulation, optimization according to data, such as noise removal of luminance and color difference and compression in the case of image data, and noise removal and compression in the case of sound data may be performed before accumulation.

When the street information acquired by the street information collection unit A-1 is an image photographed by a camera, a street information simple analysis unit A-2 performs recognition of persons photographed in the image, and determines whether the image is the information required to be provided to the location supervision server B by grasping the number of faces, a direction into which a person is traveling, and a place where a person stays, recognized within a unit time specified in advance.

When the street information acquired by the street information collection unit A-1 is the sound data acquired by the microphone, the street information collection unit A-1 accumulates the acquired sound data together with acquired date and time and day of the week information, in addition to the identification information for identifying the street information acquisition means, in the street information accumulation unit A-7, and the street information simple analysis unit A-2 determines whether the sound data acquired by the microphone is the information required to be provided to the server by comparing the sound data acquired by the microphone with sound data in the same time zone of the same day of the week accumulated in the street information accumulation unit A-7.

For example, sound data acquired by the microphone is compared with data in the same time zone of usual day, determination as to whether the data corresponds to a set threshold or characteristic is performed, such as whether the degree of roughness is large or small, how large, how small, whether the sound is a voice of a person or a sound of an object, or whether there is a preset keyword such as "good", "no", "cute", "looks delicious", "expensive", or "where is it?" in the case of the voice of a person. When the data corresponds to the set threshold or characteristic, some or all of analysis information is transmitted to a street information cooperation control unit A-3. At this time, information specifying data in the street information accumulation unit A-7 may also be transmitted together.

An external cooperation control unit A-5 causes one or a plurality of other street information collecting/providing devices A' in the neighborhood to display similar information on electronic signboard 16, which is controlled by the street information collecting/providing devices A'. In this manner, effective advertising and guidance between stores by aggregation of the plurality of street information collecting/providing devices A become possible.

Content stored in a electronic signboard information control unit A-4 is content for coupon information for promoting purchase of a product, and a street information presentation processing unit A-6 causes the electronic signboard 16 to display the coupon information stored in the electronic signboard information control unit A-4, and transmits the coupon information to a user terminal D located at a predetermined distance (for example, the radius of 10 m) from the electronic signboard 16 by push. With the transmission, the same information as the information displayed on the electronic signboard 16 can be transmitted to the user terminal D approaching the electronic signboard 16. By use of this, CM appropriate for the situation linked with a network video service or a radio service can be guided to a user.

Next, the configuration of the location supervision server B side will be described.

When the street information acquired by the street information collection unit A-1 is an image photographed by a camera and the image is transmitted to the location supervision server B, a street device information analysis unit B-3 performs recognition of a person photographed in the image, and determines eyes of the person, facial expression of the person-, and movement of the person. The street device information analysis unit B-3 analyzes the image in this manner.

An external communication information processing unit B-4 further transmits an analysis result made by the street device information analysis unit B-3 together with server identification information for identifying the location supervision server B to an external server 14 determined in advance according to the analysis result.

An external information cooperation control unit B-5 further receives information provided from the external server 14 according to the analysis result transmitted to the external server 14 by the external communication information processing unit B-4.

When the street information acquired by the street information collection unit A-1 is sound data acquired by a microphone and the sound data is transmitted to the location supervision server B, the street device information analysis unit B-3 further extracts and counts a sound, a conversation, and a sound of an object included in the sound data. The street device information analysis unit B-3 analyzes the sound data in this manner.

The external communication information processing unit B-4 further transmits the sound extracted by the street device information analysis unit B-3 together with the server identification information for identifying the location supervision server B to the external server 14 determined in advance according to the analysis result.

The external information cooperation control unit B-5 further acquires the information provided from the external server 14 according to the sound and the server identification information transmitted to the external server 14 by the external communication information processing unit B-4. This information is, for example, the content of the coupon information to be displayed on the electronic signboard 16 or the user terminal D, or a display condition.

Note that, in the present embodiment, the display condition further includes designation of content for which lighting of the electronic signboard 16 is lowered in order to reduce power consumption when the number of people existing around the electronic signboard 16 (that is, the number of people photographed in the image) is smaller than the number designated in advance, and designation of content to be displayed when a larger number of people than the number designated in advance exists within a predetermined distance from the electronic signboard 16.

Further, it is also possible to set the display condition to display the coupon information with a flash image or a sound effect such as a bell when a group of people is recognized at a place slightly away (for example, 20 m ahead) from the image acquired by the camera in displaying the coupon information on the electronic signboard. The electronic signboard 16 flash-displays the coupon information with the sound effect according to such a display condition, thereby to reliably attract distant people's attention.

Further, if a speech recognition function is installed in the street information simple analysis unit A-2, for example, exchange of interactive information via voice becomes possible, as follows.

For example, when a voice "looks expensive" is transmitted to the street information collection unit A-1 by a microphone arranged in a store, the street information simple analysis unit A-2 recognizes this voice and transmits a recognition result from the street information cooperation control unit A-3 to the location supervision server B side.

In response to this, the location supervision server B transmits the recognition result to a management system of the store (the external server 14 or an information providing service C). In response to this, the management system of the store prepares a campaign plan to discount all products by 20% in exchange for coupons and further makes drinks free, for example, and transmits text information "all products are discounted by 20% in exchange for coupons and also drinks are free" to the location supervision server B.

The location supervision server B returns this text information to the street information collecting/providing device A.

The street information collecting/providing device A receives this text information at the street information cooperation control unit A-3, and further, the street information presentation processing unit A-6 causes the electronic signboard 16 to display "all products are discounted by 20% in exchange for coupons and also drinks are free". Alternatively, the text information is output as a voice from a speaker.

People who saw the information or people who heard the information visit the store, leading to effective customer attraction.

Similarly, when a voice "crowded?" is acquired by the microphone arranged in the store, an inquiry can be made to the management system (the external server 14 or the information providing service C) of the store via the location supervision server B, and for example, proposal content from the store system such as "one seat is available now, it's our pleasure to welcome you!" can be output from the electronic signboard 16 or can be output from the speaker.

Next, an operation of the street information processing system according to the second embodiment configured as described above will be described.

First, an operation at the time of street information collection performed in the street information collecting/providing device A will be described. The operation at the time of street information collection performed in the street information collecting/providing device A conforms to the flowchart in FIG. 2, but operations performed in individual steps are more specific than those described in the first embodiment. Therefore, description will be given while showing which operation corresponds to which step in the flowchart in FIG. 2.

In step S1, to improve advertising effect and guidance to a store, data acquired at least by a camera, a microphone, and an air temperature sensor is acquired as street information by the street information collection unit A-1.

In step S2, similarly to the first embodiment, collection time information, client identification information, and street information acquisition means identification information are uniquely added to the street information, for each street information acquisition means, by the street information collection unit A-1 (S2). Further, when the street information acquired by the street information collection unit A-1 is sound data acquired by the microphone, acquisition date and time and day of the week information is also added to the sound data in addition to the identification information by the street information collection unit A-1. Then, the street information is accumulated together with the corresponding identification information in the street information accumulation unit A-7.

In step S3, similarly to the first embodiment, whether the street information is information required to be provided to the location supervision server B is determined in the street information simple analysis unit A-2. In the present embodiment, following determination is specifically made.

That is, when the street information acquired by the street information collection unit A-1 is an image photographed by a camera, the street information simple analysis unit A-2 performs recognition of persons photographed in the image, and determines whether the image is the information required to be provided to the location supervision server B by grasping the number of faces, a direction into which a person is traveling, and a place where a person stays, recognized within a unit time specified in advance.

When the street information acquired by the street information collection unit A-1 is the sound data acquired by the microphone, the street information simple analysis unit A-2 determines whether the sound data acquired by the microphone is the information required to be provided to the server by comparing the sound data with past sound data in the same time zone of the same day of the week accumulated in the street information accumulation unit A-7.

For example, sound data acquired by the microphone is compared with data in the same time zone of usual day, and determination as to whether the data corresponds to a set threshold or characteristic is performed in the street information simple analysis unit A-2, such as whether the degree of roughness is large or small, how large, how small, whether the sound is a voice of a person or a sound of an object, or whether there is a preset keyword in the case of the voice of a person.

Then, when the data corresponds to the set threshold or characteristic, some or all of analysis information is sent to the street information cooperation control unit A-3. At this time, information specifying data in the street information accumulation unit A-7 is transmitted together as needed.

In step S4, similarly to the first embodiment, an image and sound data as the street information determined to be required to be provided by the determination of the street information simple analysis unit A-2 is transmitted together with the client identification information by the street information cooperation control unit A-3 to the location supervision server B via the communication network 12.

In this way, the image and sound data as the street information collected by the street information collecting/providing device A is transmitted to the location supervision server B via the communication network 12.

Next, an operation performed by the location supervision server B to which the image and sound data has been transmitted from the street information collecting/providing device A will be described. This operation performed in the location supervision server B conforms to the flowcharts in FIGS. 3 and 4, but operations performed in individual steps are more specific than those described in the first embodiment. Therefore, description will be given while showing which operation corresponds to which step in the flowcharts in FIGS. 3 and 4.

In step S11, the image and sound data as the street information and the client identification information transmitted by the street information cooperation control unit A-3 are received by the street device information collection management unit B-2 in the location supervision server B.

In step S12, the image and sound data as the street information and the client identification information are further accumulated together with acquisition time information indicating the time acquired by the street device information collection management unit B-2, in the street device information accumulation unit B-9.

In step S13, the image and sound data as the street information accumulated in the street device information accumulation unit B-9 are analyzed by the street device information analysis unit B-3. Specifically, as for the image, recognition of a person is performed, and eyes of the person, facial expression of the person, and movement of the person are determined. As for the sound data, a sound, a conversation, and a sound of an object included in the sound data are extracted and counted. In this manner, the image and the sound data are analyzed.

In step S14, as in the first embodiment, whether the street information exceeds a threshold or corresponds to a characteristic is determined. In the present embodiment, this determination is equivalent to determining whether the number of recognized people or the number of sounds counted has reached a preset threshold value.

Then, when a result showing that the street information has reached the threshold is obtained, in step S15, part or all of analysis information is accumulated in a street issue information accumulation unit B-10, as in the first embodiment.

In step S16, such analysis information is transmitted together with server identification information from the external communication information processing unit B-4 to the external server 14 determined in advance.

In step S17, information is provided from the external server 14 according to the analysis information transmitted to the external server 14. This information is, for example, the content of the coupon information to be displayed on the electronic signboard 16 or the user terminal D, or a display condition, and is received by the external information cooperation control unit B-5.

Thereafter, by the operations as described in steps S18 to S20, the information provided by the external server 14 (the content of the coupon information and the display condition) is returned together with at least the server identification information to the street information collecting/providing device A that has acquired the corresponding street information (image/sound data).

In this way, the information according to the street information (image/sound data) is acquired from the external server 14, and the acquired information (the content of the coupon information and the display condition) is returned to the street information collecting/providing device A, by the location supervision server B.

Next, an operation of when content is displayed on the electronic signboard 16 and/or the user terminal D by the street information collecting/providing device A will be described with reference to the flowchart in FIG. 6.

As described above, the content of the coupon information for prompting purchase of products and the display condition, which are the information provided from the external server 14 to the street information collecting/providing device A in step S20, is received by the street information cooperation control unit A-3 and is stored in the electronic signboard information control unit A-4 (S41).

For example, the content for the coupon information stored in the electronic signboard information control unit A-4 is displayed on the electronic signboard 16 by the street information presentation processing unit A-6 according to the display condition (S42).

For example, as the display condition, content for which lighting of the electronic signboard 16 is lowered is designated when the number of people existing around the electronic signboard 16 (that is, the number of people photographed in the image) is smaller than the number designated in advance. By setting such a display condition, power consumption can be saved. Further, for example, content that is displayed when a larger number of people than the number designated in advance exists within a predetermined distance from the electronic signboard 16 is designated. By setting such a display condition, a campaign can be more effectively conducted.

Further, it is also possible to set the display condition to display the coupon information with a flash image or a sound effect such as a bell when a group of people is recognized at a place slightly away from the image acquired by the camera in displaying the coupon information on the electronic signboard 16. The electronic signboard 16 flash-displays the coupon information with the sound effect, thereby to reliably attract distant people's attention.

The content for the coupon information is transmitted not only to the electronic signboard 16 but also to the user terminals D located within a predetermined distance from the electronic signboard 16 by push from the street information presentation processing unit A-6 according to the display condition (S43).

In this manner, the coupon information can be effectively displayed on the electronic signboard 16 and/or the user terminal D according to the display condition.

Further, those skilled in the art will understand that the above-described operation can be more interactively conducted through a voice, as described below, by installing a voice recognition function in the street information simple analysis unit A-2. An example of the operation in this case will be briefly described with reference to the flowchart in FIG. 7.

For example, a voice "looks expensive" is acquired by the microphone disposed in the store and is sent to the street information simple analysis unit A-2 via the street information collection unit A-1 (S51). Then, this voice is recognized by the voice recognition function of the street information simple analysis unit A-2, and a recognition result is transmitted from the street information cooperation control unit A-3 to the location supervision server B side (S52).

This recognition result is further sent from the location supervision server B to the management system (the external server 14 or the information providing service C) of the store. In response to this, the management system of the store prepares a campaign plan to discount all products by 20% in exchange for coupons and further makes drinks free (S53), for example, and transmits the text information "all products are discounted by 20% in exchange for coupons and also drinks are free" to the location supervision server B (S54). This text information is returned from the location supervision server B to the street information collecting/providing device A.

In the street information collecting/providing device A, this text information is received by the street information cooperation control unit A-3, and further, the street information presentation processing unit A-6 causes the electronic signboard 16 to display "all products are discounted by 20% in exchange for coupons and also drinks are free". Alternatively, the text information is output as a voice from a speaker (S55).

People who saw this information or who heard the information visit the store (S56).

As in this example, it is possible to lead to effective customer attraction.

As described above, in the street information processing system according to the present embodiment, the image and sound data as the street information collected by the street information collecting/providing device A can be transmitted to the location supervision server B via the communication network 12 according to the above-described functions.

Further, the information according to the street information (image/sound data) can be acquired from the external server 14, and the acquired information (the content of the coupon information and the display condition) can be returned to the street information collecting/providing device A, by the location supervision server B.

Further, the coupon information can be effectively displayed on the electronic signboard 16 and/or the user terminal D according to the display condition.

Furthermore, the above-described operation can be more interactively conducted through a voice by installing the voice recognition function in the street information simple analysis unit A-2.

As described above, according to the present embodiment, the promotion and guidance of a store can be more efficiently and effectively executed.

Third Embodiment

A third embodiment of the present invention will be described.

In a street information processing system according to the third embodiment of the present invention, the street information processing system according to the second embodiment is applied for guidance at the time of disaster. Therefore, hereinafter, matters specific to the present embodiment will be described while avoiding redundant description of the portions already described in the first and second embodiments by assigning the same reference numerals.

First, a configuration of a street information collecting/providing device A side will be described.

In the present embodiment, as in the second embodiment, a voice recognition function is mounted on a street information simple analysis unit A-2. Therefore, as described in the second embodiment, operations can be more interactively performed through voice.

When street information acquired by a street information collection unit A-1 is sound data acquired by a microphone, the street information simple analysis unit A-2 determines whether preset keywords are included in the sound data, using the voice recognition function. Examples of preset keywords are "fire", "earthquake", "evacuation", "ambulance", "telephone", and "not connected". Furthermore, when such keywords are included in the sound data, whether the number of the included keywords is larger or smaller than a preset threshold is determined. Then, whether the sound data is information required to be provided to a location supervision server B is determined based on a determination result.

Further, when the street information acquired by the street information collection unit A-1 is an image acquired by a camera in a time zone when a fire has occurred in the neighborhood, for example, the street information simple analysis unit A-2 transmits the image to the location supervision server B side via a street information cooperation control unit A-3 because there is a possibility that the image includes information regarding specification of the fire.

Furthermore, when the street information simple analysis unit A-2 determines that the street information acquired by the street information collection unit A-1 is acquired during evacuation guidance, and has a possibility of including information related to occurrence of fire, earthquake, lightning strike, collapse, cliff collapse, avalanche, and the like, the street information simple analysis unit A-2 transmits the street information together with position information and progress information as needed to the location supervision server B side via the street information cooperation control unit A-3.

For example, the street information simple analysis unit A-2 determines that a fire has occurred in the following cases. That is, when the street information acquired by the street information collection unit A-1 is temperature information acquired by a temperature sensor and, in the temperature information, a temperature rise exceeding a predetermined temperature rise rate is confirmed and then no response is given from the temperature sensor, the street information simple analysis unit A-2 determines that a fire has occurred near the street information collecting/providing device A.

Further, for example, the street information simple analysis unit A-2 determines that an earthquake has occurred in the following cases. That is, when the street information acquired by the street information collection unit A-1 is at least either acceleration data acquired by an acceleration sensor or vibration data acquired by a vibration sensor, the acceleration data or the vibration data exceeds a predetermined value, and then no response is given from the acceleration sensor or the vibration sensor, the street information simple analysis unit A-2 determines that the street information collecting/providing device A is shaken by an earthquake.

Furthermore, for example, the street information simple analysis unit A-2 determines that a lightning strike has occurred in the following cases. That is, when the street information acquired by the street information collection unit A-1 is light and dark data acquired by a light and dark sensor, and the light and dark data is sharply changed to brightness exceeding a threshold, the street information simple analysis unit A-2 determines that a lightning strike has occurred near the street information collecting/providing device A.

Next, the configuration of the location supervision server B side will be described.

When the street information collected by the street information collection unit A-1 at the time of disaster is transmitted to the location supervision server B, an external communication information processing unit B-4 transmits the street information to an external server 14. When the street information is an image acquired in a time zone when a fire has occurred in the neighborhood, there is a possibility that the image includes information regarding specification of the fire, and thus the image is transmitted to the external server 14. Further, possibility information, progress information, and position information of fire, earthquake, lightning strike, collapse, cliff collapse, avalanche, or the like, which have been transmitted from the street information collecting/providing device A side during evacuation guidance, are also transmitted to the external server 14.

The external server 14 specifies the disaster, grasps the situation, and develops an evacuation plan, based on the information, and transmits disaster information to an external information cooperation control unit B-5 The disaster information further includes evacuation guidance information and announcement information regarding the disaster.

The external information cooperation control unit B-5 receives the disaster information transmitted from the external server 14.

A device street issue information control unit B-7 determines one or more street information collecting/providing devices A that require output of the evacuation guidance information and the announce information, and output timing from each of the street information collecting/providing devices A, based on the position information of the plurality of street information collecting/providing devices A obtained from a device position information acquisition unit B-1 and the disaster information received by the external information cooperation control unit B-5. This output timing is included in the display condition.

Further, the device street issue information control unit B-7 transmits the evacuation guidance information and the announcement information together with the display condition to the determined one or more street information collecting/providing devices A.

In the street information collecting/providing device A to which the information has been transmitted, the evacuation guidance information and the announce information are output on electronic signboard 16 according to the output timing included in the display condition, by an operation of a street information presentation processing unit A-6.

Next, an operation of the street information processing system according to the third embodiment configured as described above will be described.

First, an operation at the time of street information collection performed in the street information collecting/providing device A will be described. The operation at the time of street information collection performed in the street information collecting/providing device A conforms to the flowchart in FIG. 2, but operations performed in individual steps are more specific than those described in the first embodiment. Therefore, description will be given while showing which operation corresponds to which step in the flowchart in FIG. 2.

In step S1, the street information is acquired by the street information collection unit A-1. In the present embodiment, the street information includes, for example, sound data acquired by a microphone, an image acquired by a camera, temperature information acquired by a temperature sensor, acceleration data acquired by an acceleration sensor, and vibration data acquired by a vibration sensor, light and dark data acquired by a light and dark sensor, and the like.

In step S2, similarly to the second embodiment, collection time information, client identification information, and street information acquisition means identification information are uniquely added to the street information, for each street information acquisition means, by the street information collection unit A-1 (S2). Then, the street information is accumulated together with the corresponding identification information in the street information accumulation unit A-7.

In step S3, similarly to the first embodiment, in the street information simple analysis unit A-2, whether the street information is information required to be provided to the location supervision server B is determined. In the present embodiment, specifically, the following determination is made.

That is, when the street information acquired by the street information collection unit A-1 is sound data acquired by a microphone, the street information simple analysis unit A-2 determines whether preset keywords such as "fire", "earthquake", "evacuation", "ambulance", "telephone", "not connected" are included in the sound data, using the voice recognition function. Furthermore, when such keywords are included in the sound data, whether the number of the included keywords is larger or smaller than a preset threshold is determined. Then, whether the sound data is information required to be provided to the location supervision server B is determined based on a determination result.

Further, when the street information acquired by the street information collection unit A-1 is an image acquired by a camera in a time zone when a fire has occurred in the neighborhood, for example, the street information simple analysis unit A-2 determines that specification of this image is required because there is a possibility that the image includes information regarding the fire.

Further, the street information acquired by the street information collection unit A-1 is acquired during evacuation guidance, and whether there is a possibility that the street information includes information related to occurrence of fire, earthquake, lightning strike, collapse, cliff collapse, avalanche, or the like is determined by the street information simple analysis unit A-2.

For example, when the street information acquired by the street information collection unit A-1 is temperature information acquired by a temperature sensor and, in the temperature information, a temperature rise exceeding a predetermined temperature rise rate is confirmed and then no response is given from the temperature sensor, the street information simple analysis unit A-2 determines that a fire has occurred near the street information collecting/providing device A.

Further, for example, when the street information acquired by the street information collection unit A-1 is at least either acceleration data acquired by an acceleration sensor or vibration data acquired by a vibration sensor, the acceleration data or the vibration data exceeds a predetermined value, and then no response is given from the acceleration sensor or the vibration sensor, the street information simple analysis unit A-2 determines that the street information collecting/providing device A is shaken by an earthquake.

Furthermore, for example, when the street information acquired by the street information collection unit A-1 is light and dark data acquired by a light and dark sensor, and the light and dark data exhibits brightness sharply exceeding a threshold, the street information simple analysis unit A-2 determines that a lightning strike has occurred near the street information collecting/providing device A.

In step S4, the sound data, the image, the temperature data, the acceleration data, the vibration data, the light and dark date, and the like are transmitted together with the identification information, the position information, and the progress information as needed from the street information cooperation control unit A-3 to the location supervision server B.

In this way, the street information collected by the street information collecting/providing device A at the time of disaster is transmitted to the location supervision server B via a communication network 12.

Next, an operation performed by the location supervision server B to which the street information has been transmitted from the street information collecting/providing device A at the time of disaster will be described. This operation performed in the location supervision server B conforms to the flowcharts in FIGS. 3 and 4, but operations performed in individual steps are more specific than those described in the first embodiment. Therefore, description will be given while showing which operation corresponds to which step in the flowcharts in FIGS. 3 and 4.

In step S11, the street information and accompanying identification information and the like transmitted by the street information cooperation control unit A-3 are received by a street device information collection management unit B-2 in the location supervision server B.

In step S12, the street information and the identification information and the like are further accumulated together with the acquisition time information indicating the time acquired by the street device information collection management unit B-2 in the street device information accumulation unit B-9.

These pieces of information accumulated in the street device information accumulation unit B-9 are transmitted to the external server 14 by the external communication information processing unit B-4. This operation corresponds to step S16.

The external server 14 specifies the disaster, grasps the situation, and develops an evacuation plan, based on the information, and transmits disaster information to the external information cooperation control unit B-5 The disaster information includes the evacuation guidance information and the announcement information regarding the disaster.

In step S17, the disaster information transmitted from the external server 14 is received by the external information cooperation control unit B-5, and in step S18 the disaster information is accumulated in a street issue information accumulation unit B-10.

In step S19, in the device street issue information control unit B-7, one or more street information collecting/providing devices A that require output of the evacuation guidance information and the announce information, and the output timing from each of the street information collecting/providing devices A are determined based on the position information of the plurality of street information collecting/providing devices A obtained from the device position information acquisition unit B-1 and the disaster information received by the external information cooperation control unit B-5 and accumulated in the street issue information accumulation unit B-10. This output timing is included in the display condition.

In step S20, the evacuation guidance information and the announce information are transmitted together with the display condition from the device street issue information control unit B-7 to the one or more street information collecting/providing devices A determined by the device street issue information control unit B-7.

In the street information collecting/providing device A to which the information has been transmitted, the evacuation guidance information and the announce information are output on the electronic signboard 16 or a user terminal D according to the output timing included in the display condition, by an operation of a street information presentation processing unit A-6.

In this way, at the time of disaster, the appropriate evacuation guidance information and announce information according to the arrangement place of the street information collecting/providing device A are effectively output from the electronic signboard 16 and the user terminal D according to the output timing included in the display condition.

Figure 7:
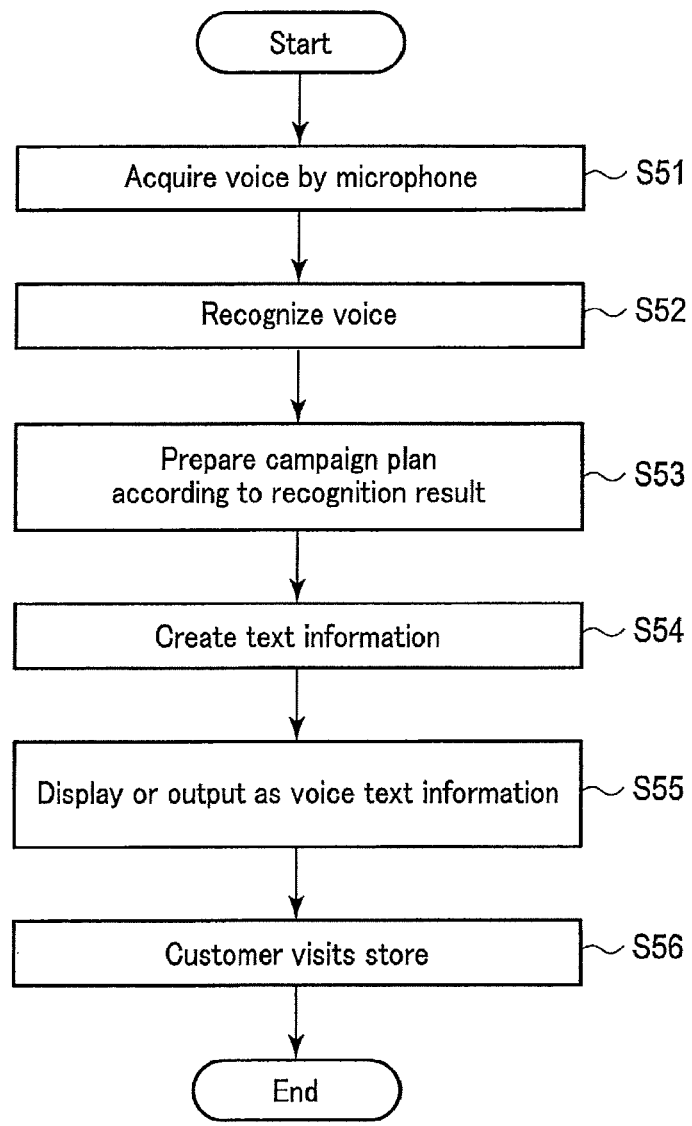
FIG. 7 is a flowchart illustrating an operation example of when content is displayed from an electronic signboard and/or a user terminal using a sound recognition function in the street information processing system according to the second embodiment.

In the present embodiment, since the voice recognition function is installed in the street information simple analysis unit A-2, those skilled in the art will be able to recall implementation of more interactive operations via voice even in the event of a disaster, as described in the second embodiment with reference to FIG. 7.

Such an operation example in the present embodiment will be briefly described by applying operations to the steps in FIG. 7.

In step S51, a voice is acquired by the microphone. Assume that the voice includes the keywords such as "ambulance", "telephone", and "not connected" in step S52.

Then, in step S53, a countermeasure is planed instead of a campaign plan. This countermeasure is to inform a nearby fire department using an emergency wired line, for example, in order to request emergency vehicle dispatch. In this case, text information created in step S54 is "requested the E fire department to dispatch an ambulance by the priority line in case of emergency."

In step S55, the text information "requested the E fire department to dispatch an ambulance by the priority line in case of emergency" is displayed on or output with a voice from the electronic signboard 16 or the user terminal D.

An ambulance dispatch is requested to the fire department according to the countermeasures planed in step S53. In this case, the information providing service C corresponds to a management system of the fire department. If the fire department gets back to the user in response to the request, display or a voice "a call from the E fire department, please answer" can be output from the electronic signboard 16 or the user terminal D, to enable the fire department to talk with the user.

As described above, in the street information processing system according to the present embodiment, the street information collected by the street information collecting/providing device A at the time of disaster can be transmitted to the location supervision server B via the communication network 12 according to the above-described functions.

In addition, the appropriate evacuation guidance information and announce information according to the arrangement place of the street information collecting/providing device A can be effectively output from the electronic signboard 16 and the user terminal D according to the output timing included in the display condition.

As described above, according to the present embodiment, effective evacuation guidance at the time of disaster can be performed.

Fourth Embodiment

A fourth embodiment of the present invention will be described.

In a street information processing system according to the fourth embodiment of the present invention, the street information processing system according to the first embodiment is applied for infrastructure control, crime prevention, user support, theme park, and emergency evacuation guidance. Therefore, hereinafter, matters specific to the present embodiment will be described while avoiding redundant description of the portions already described in the first embodiment by assigning the same reference numerals.

First, an application example to infrastructure control will be described.

When street information acquired by a street information collection unit A-1 is sensing data acquired by a human sensor or an image acquired by a camera, a street information simple analysis unit A-2 determines existence of human in the neighborhood based on the street information, and an external cooperation control unit A-5 controls air conditioning, lighting, and the like according to the determination. For example, when the street information simple analysis unit A-2 determines that there is no person in the neighborhood based on the street information, the external cooperation control unit A-5 dims the streetlight or turns off the air conditioning. On the other hand, when the street information simple analysis unit A-2 determines that there is a person in the neighborhood or a person is approaching, the external cooperation control unit A-5 increases lighting of the streetlight or turns on the air conditioning.

Next, an application example to crime prevention will be described.

When a sound acquired by a microphone, as the street information acquired by the street information collection unit A-1, is determined to be larger than a threshold by the street information simple analysis unit A-2, the external cooperation control unit A-5 determines that abnormality has occurred, and lights a streetlight near a street information collecting/providing device A and controls the street information collection unit A-1 to cause a camera to photograph a vicinity of an arrangement place of the street information collecting/providing device A. Further, a street information cooperation control unit A-3 transmits an image photographed by the camera to a location supervision server B via a communication network 12. In this way, occurrence of abnormality is automatically notified.

Next, an application example to user support will be described.

As an application example to user support, a service to notify a user of a location of a public toilet will be described.

When a user who is walking on a boardwalk wishes to know the location of the nearest public toilet, the user requests a near street information collecting/providing device A to present the location of the nearest public toilet using a user terminal D via a street information presentation processing unit A-6 This request can be made, for example, using an app installed in the user terminal D, and is transmitted together with position information and user terminal identification information.

When receiving this request together with the position information and the user terminal identification information, the street information presentation processing unit A-6 acquires map information indicating nearby public toilets from an electronic signboard information control unit A-4 based on the position information. When no map information is stored in the electronic signboard information control unit A-4, the map information is acquired from the location supervision server B or an external server 14 via the location supervision server B. Then, the map information is returned to the requester user terminal D according to the user terminal identification information, and is displayed on a web browser of the user terminal D.

Next, an application example in a theme park will be described.

As an application example in a theme park, a wait time information service of vehicles and attractions and a lost child finding service will be described.

A camera connected to the street information collection unit A-1 installed near a gate of a vehicle or an attraction photographs a queue of waiting people, and the street information simple analysis unit A-2 recognizes the number of photographed faces and calculates an approximate wait time based on the number of recognized faces.

Then, the external cooperation control unit A-5 transmits this wait time together with a name of the corresponding vehicle or attraction to other street information collecting/providing devices A' provided at various places in the theme park. In response to this, each street information collecting/providing device A' causes electronic signboard 16 to display the wait time together with the name of the corresponding vehicle or attraction. By viewing the display, the user grasp the wait time of each vehicle or attraction.

Alternatively, a special app is installed in advance in the user terminal D of the user such as a smartphone or the like, and the street information presentation processing unit A-6 sends the wait time together with the name of the vehicle or attraction to the user terminal D. As a result, each user grasps the wait time of each vehicle or attraction by his/her smartphone.

Further, when a child gets lost in a theme park and cries, a microphone connected to any one of the street information collection units A-1 provided at various places in the theme park catches the cry.

Then, the street information simple analysis unit A-2 determines that the child is lost from the cry and sends a determination result together with an identification number of the street information collection unit A-1 that has caught the cry to the external cooperation control unit A-5. This identification number is used as position information in the theme park. The external cooperation control unit A-5 sends the determination result and the identification number (the position information in the theme park) of the street information collection unit A-1 that has caught the cry to another street information collecting/providing device A' that is a lost child protection center in the theme park in this case.

In response to this, the lost child protection center protects the child who got lost, and makes a lost child announcement in the theme park.

Next, an application example in individual evacuation guidance at emergency will be described.

The street information collection unit A-1 collects a temperature measured by an air temperature sensor and an image photographed by a camera, and sends the information to the street information simple analysis unit A-2.

When the temperature measured by the air temperature sensor exceeds a threshold or smoke or flame is captured in the image photographed by the camera, the street information simple analysis unit A-2 determines that a fire has occurred near the street information collection unit A-1.

In response to this, the external cooperation control unit A-5 notifies another street information collecting/providing device A' of the determination result by the street information simple analysis unit A-2.

In response to this, the street information collecting/providing device A' causes corresponding electronic signboard 16 to display a direction away from a street information collecting/providing device A as a notification source, as an evacuation direction. However, there may be a plurality of directions. For example, when a fire has occurred in the south, the evacuation direction can be three directions including the north side, east side, and west side.

In order for many people to efficiently complete evacuation in a short time, it is necessary to properly distribute evacuation directions so that people do not concentrate in a specific evacuation direction. Therefore, the street information collection unit A-1 of each street information collecting/providing device A (or A') photographs the situation in evacuation with the camera. Then, each street information simple analysis unit A-2 grasps the congestion state in evacuation based on this image.

In response to this, the external cooperation control unit A-5 outputs the congestion state together with the identification information of the street information collecting/providing device A (or A') to another street information collecting/providing device A'.

In response to this, each street information simple analysis unit A-2 of each street information collecting/providing device A (or A') determines which direction people should be evacuated according to the congestion state, and the street information presentation processing unit A-6 causes the electronic signboard 16 to display the direction.

Next, an operation of the street information processing system according to the fourth embodiment configured as described above will be described.

First, an operation in an application example to infrastructure control will be described with reference to the flowchart of FIG. 8.

Sensing data acquired by the human sensor and an image photographed by the camera are acquired by the street information collection unit A-1 (S61).

Presence of people in the neighborhood is determined by the street information simple analysis unit A-2 based on the street information acquired by the street information collection unit A-1 (S62).

Then, when it is determined that there is no person in the neighborhood (S62: No), the external cooperation control unit A-5 performs control to dim the streetlight, turn off the air conditioning, and the like (S63).

On the other hand, when it is determined that there is a person in the neighborhood or a person is approaching (S62: Yes), the external cooperation control unit A-5 perform control to increase the lighting of the streetlight, turn on the air conditioning, and the like (S64).

With such infrastructure control, useless power usage can be avoided and energy saving can be achieved.

Figure 9:
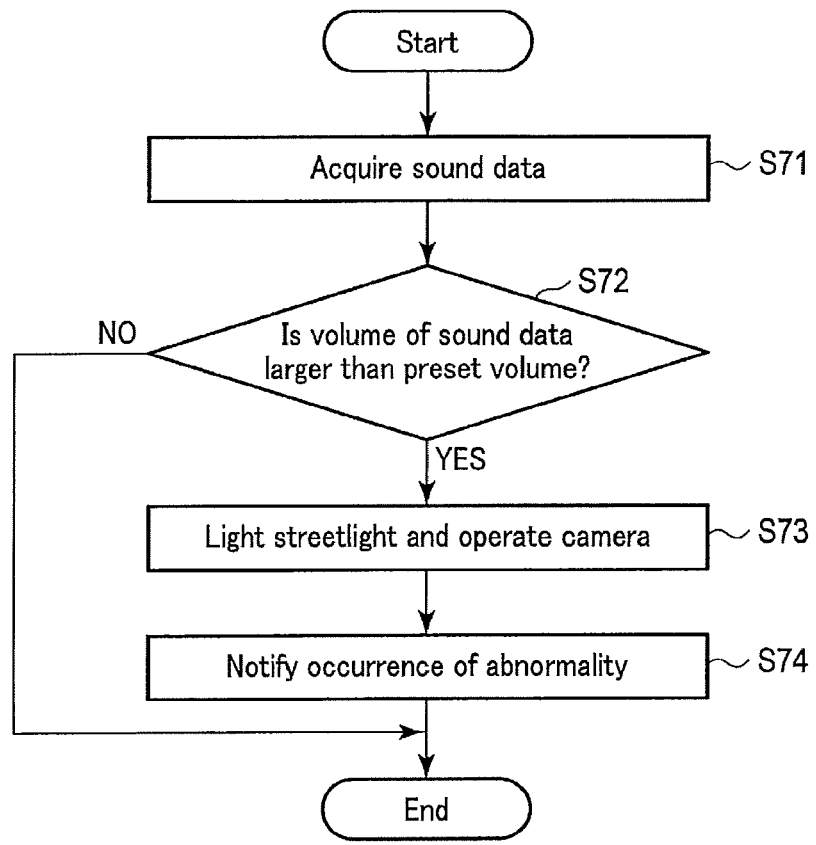
FIG. 9 is a flowchart illustrating an operation example in an application example of the street information processing system according to the fourth embodiment to crime prevention.

Next, an operation in an application example for crime prevention will be described with reference to the flowchart of FIG. 9.

The sound data acquired by the microphone is acquired by the street information collection unit A-1 (S71).

Whether the volume of the sound data is larger than a preset volume is determined by the street information simple analysis unit A-2 (S72).

When the volume is determined to be large (S72: Yes), occurrence of abnormality is determined, and the street lights near the street information collecting/providing device A are lit by the external cooperation control unit A-5, and the street information collection unit A-1 is controlled to cause the camera to photograph the neighborhood of the arrangement place of the street information collecting/providing device A (S73).

Furthermore, the image photographed by the camera is transmitted to the location supervision server B via the communication network 12 by the street information cooperation control unit A-3, and the occurrence of abnormality is automatically notified (S74).

Thus, when a large voice like "help!" is acquired by the microphone, for example, the streetlight is immediately lit, an image of the neighborhood is photographed by the camera, and the captured image is transmitted to the location supervision server B via the communication network 12, whereby occurrence of abnormality is automatically reported, and crimes and the like can be prevented in advance.

Figure 10:
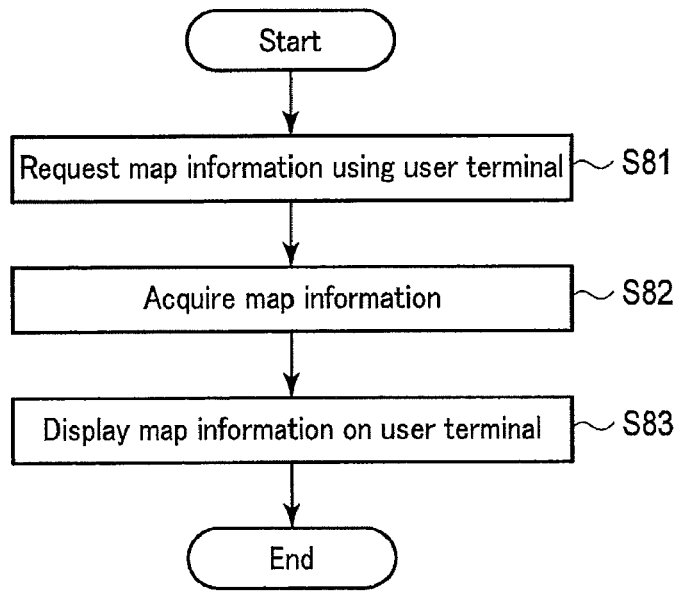
FIG. 10 is a flowchart illustrating an operation example in an application example of the street information processing system according to the fourth embodiment to user support.

Next, as an application example to user support, an operation in a service for notifying a location of a public toilet will be described with reference to the flowchart of FIG. 10.

When a user who is walking on a boardwalk wishes to know the location of the nearest public toilet, the user requests a near street information collecting/providing device A to present the location of the nearest public toilet using a user terminal D via a street information presentation processing unit A-6 This request can be made, for example, using an app installed in the user terminal D, and is transmitted together with the position information and the user terminal identification information (S81).

This request is received together with the position information and the user terminal identification information by the street information presentation processing unit A-6. In response to this, the map information indicating nearby public toilets is acquired by the street information presentation processing unit A-6 from the electronic signboard information control unit A-4 based on the position information (S82). When no map information is stored in the electronic signboard information control unit A-4, the map information is acquired from the location supervision server B or the external server 14 via the location supervision server B.

The map information is further returned to the requester user terminal D according to the user terminal identification information by the street information presentation processing unit A-6, and is displayed on a web browser of the user terminal D (S83).

By viewing this map information, the user can reach the nearest toilet.

Next, as an application example in a theme park, an operation in the wait time information service of vehicles and attractions and the lost child finding service will be described.

Figure 11:
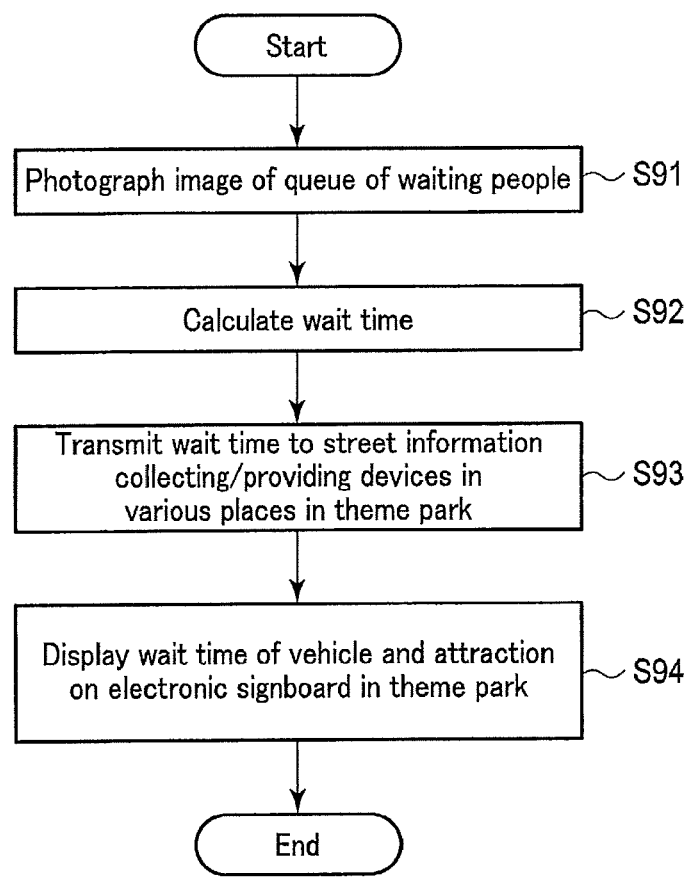
FIG. 11 is a flowchart illustrating an operation example in a wait time information service.

FIG. 11 is a flowchart showing an operation example in the wait time information service.

When the camera connected to the street information collection unit A-1 installed near a gate of a vehicle or an attraction photographs a queue of waiting people, the captured image is sent to the street information simple analysis unit A-2 (S91).

In the street information simple analysis unit A-2, the number of faces is recognized from the captured image, and an approximate wait time is calculated based on the number of recognized faces (S92).

Then, this wait time is transmitted together with the name of the corresponding vehicle or attraction by the external cooperation control unit A-5 to other street information collecting/providing devices A' provided at various places in the theme park (S93).

In response to this, at each street information collecting/providing device A', the wait time is displayed together with the name of the corresponding vehicle and attraction on the electronic signboard 16 (S94). By viewing the display, the user can grasp the wait time of each vehicle or attraction.

Alternatively, a special app may be installed in advance in the user terminal D of the user such as a smartphone or the like, and the street information presentation processing unit A-6 may send the wait time together with the name of the vehicle or attraction to the user terminal D. As a result, each user can grasp the wait time of each vehicle or attraction by his/her smartphone.

FIG. 12 is a flowchart illustrating an operation example in the lost child finding service.

When a child gets lost in a theme park and cries, the microphone connected to any one of the street information collection units A-1 provided at various places in the theme park catches the cry. (S101).

Then, from this cry, the street information simple analysis unit A-2 determines that the child is lost (S102). This determination result is sent together with the identification number of the street information collection unit A-1 that has caught the cry to the external cooperation control unit A-5.

The determination result and the identification number of the street information collection unit A-1 that has caught the cry are sent from the external cooperation control unit A-5 to another street information collecting/providing device A' that is a lost child protection center in the theme park in this case (S103). This identification number is used as position information in the theme park.

In response to this, the child who got lost is protected by a staff in the lost child protection center, and a lost child announcement is made in the theme park (S104).

Figure 13:
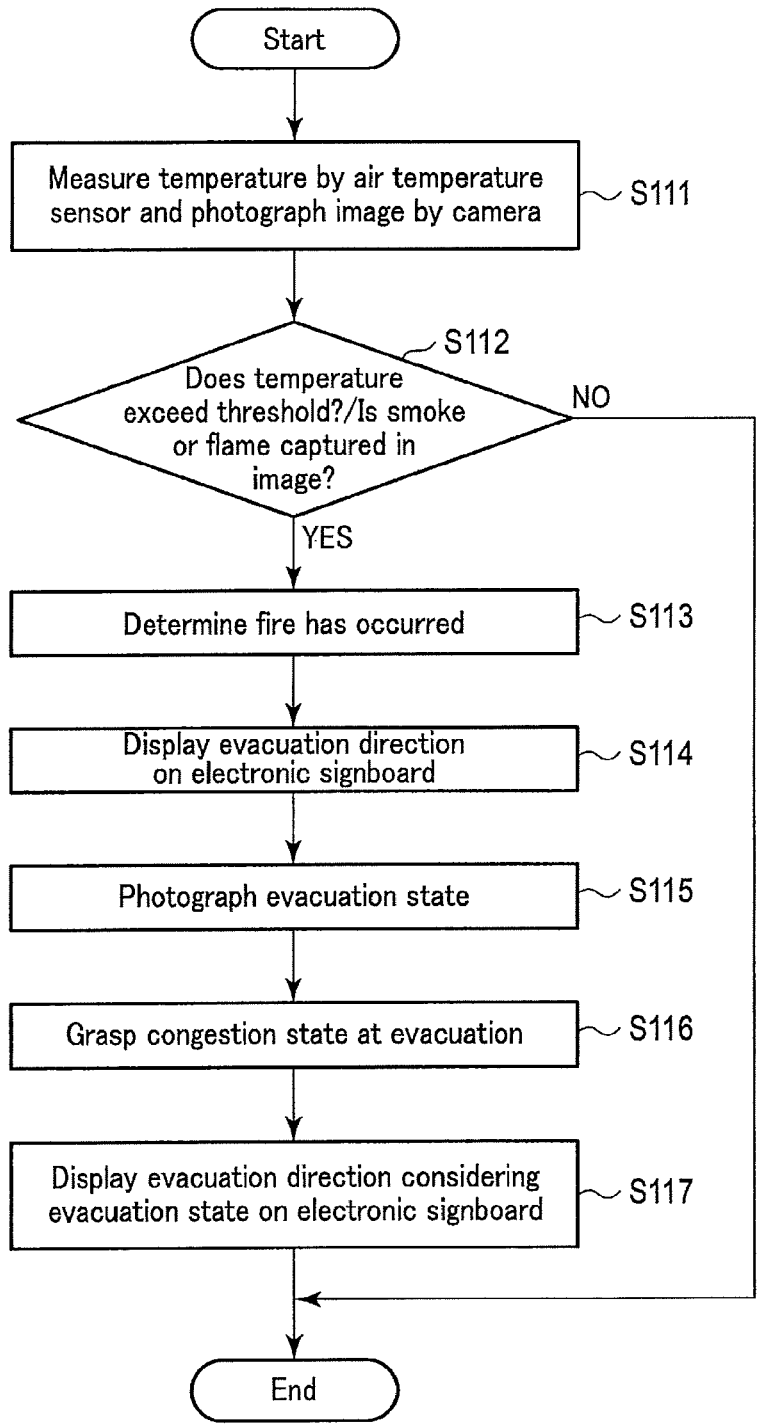
FIG. 13 is a flowchart illustrating an operation example in an individual evacuation guidance service in an emergency.

Next, ab operation in the individual evacuation guidance service at the time of emergency will be described with reference to the flowchart in FIG. 13.

Hereinafter, as an example, an evacuation guidance service at the time of occurrence of fire will be explained. However, the embodiment is similarly applicable to other disasters such as earthquake and tsunami.

The temperature measured by the air temperature sensor and the image photographed by the camera are collected by the street information collection unit A-1 and sent from the street information collection unit A-1 to the street information simple analysis unit A-2 (S111).

When the temperature measured by the air temperature sensor exceeds a threshold or smoke or flame is captured in the image photographed by the camera (S112:Yes), the street information simple analysis unit A-2 determines that a fire has occurred near the street information collection unit A-1, and the determination result by the street information simple analysis unit A-2 is sent from the external cooperation control unit A-5 to another street information collecting/providing device A' (S113).

In response to this, the street information collecting/providing device A' causes corresponding electronic signboard 16 to display a direction away from the street information collecting/providing device A as a notification source, as an evacuation direction (S114).

However, there may be a plurality of directions. For example, when a fire has occurred in the south, the evacuation direction can be three directions including the north side, east side, and west side. In order for many people to efficiently complete evacuation in a short time, it is necessary to properly distribute evacuation directions so that people do not concentrate in a specific evacuation direction.

Therefore, the street information collection unit A-1 of each street information collecting/providing device A (or A') photographs the situation in evacuation with the camera (S115). Then, each street information simple analysis unit A-2 grasps the congestion state in evacuation based on this image (S116).

In response to this, the external cooperation control unit A-5 outputs the congestion state together with the identification information of the street information collecting/providing device A (or A') to another street information collecting/providing device A'. In response to this, each street information simple analysis unit A-2 of each street information collecting/providing device A (or A') determines which direction people should be evacuated according to the congestion state, and the direction is displayed on the electronic signboard 16 (S117).

As described above, in the street information processing system of the present embodiment, energy saving of infrastructure equipment can be achieved by the above-described functions. Further, occurrence of abnormality can be automatically reported, and thus crimes and the like can be prevented in advance. Furthermore, appropriate information can be provided to a request of a user in traveling in a short time. Furthermore, efficient use of a theme park can be supported. Further, individual evacuation guidance at the time of disaster can be realized.

Fifth Embodiment

A fifth embodiment of the present invention will be described.

In a street information processing system according to the fifth embodiment of the present invention, the street information collecting/providing device A, of the street information processing system according to the first embodiment, is applied to a navigation system such as car navigation, by a combination with a user terminal D such as a smart phone. Therefore, hereinafter, matters specific to the present embodiment will be described while avoiding redundant description of the portions already described in the first embodiment by assigning the same reference numerals.

In the present embodiment, the street information collecting/providing device A is applied to a car navigation device by a combination with the user terminal D such as a smart phone, and thus the street information collecting/providing device A is installed in a moving body such as a vehicle.

When the street information collecting/providing device A and the user terminal D are applied as a car navigation device, an activation operation is performed from a special app installed in the user terminal D. When the activation operation is performed, first, user authentication is performed as follows.

(User Authentication Function)

An operation at the time of user authentication will be described with reference to the flowchart in FIG. 14.

When a user attempts activation of the app using the user terminal D, the app prompts, by a screen display on the user terminal D or a voice, the user to speak into a microphone of the user terminal D for user authentication (S121).

When the user speaks into the microphone, a street information collection unit A-1 acquires the voice, and a street information simple analysis unit A-2 recognizes the voice using a voice recognition function. Further, a street information cooperation control unit A-3 adds user terminal identification information identifying the user terminal D to the recognized voice, and transmits the voice to a location supervision server B (S122).

The location supervision server B accumulates voice information of the user in a street issue information accumulation unit B-10 in association with the user terminal identification information in advance.

When the recognized voice and the user terminal identification information are transmitted to the location supervision server B, a street device information analysis unit B-3 acquires the voice associated with the user terminal identification information from the street issue information accumulation unit B-10. The street device information analysis unit B-3 further compares the acquired voice with the voice transmitted from the street information cooperation control unit A-3 to perform user authentication (S123). Then, as a result of the comparison, these voices are determined to be uttered by the same person and the authentication has succeeded (S124: Yes), use of the app is permitted (S125).

On the other hand, as a result of the comparison, these voices are not determined to be uttered by the same person, and the authentication has failed (S124: No), use of the app is not permitted (S126).

The app further a map information acquisition function, a course search function, an ETC function, a traffic information providing function, and a drowsy driving prevention function, as will be separately described below.

(Map Information Acquisition Function)

The map information acquisition function will be described with reference to the flowchart in FIG. 15.

The street information collection unit A-1 acquires position data acquired by a GPS as street information on a steady basis (S131). As the GPS, one built in the user terminal D such as a smartphone communicating with a street information presentation processing unit A-6 is used. Alternatively, a GPS exclusively connected to the street information collection unit A-1 may be used.

In addition, the street information collection unit A-1 acquires a voice acquired by a microphone as the street information (S132). As the microphone, one built in the user terminal D such as a smartphone communicating with the street information presentation processing unit A-6 is used. Alternatively, a microphone exclusively connected to the street information collection unit A-1 may be used. Information acquired by the microphone undergoes appropriate processing such as noise removal, and voice recognition, as needed.

The street information simple analysis unit A-2 recognizes the voice using the voice recognition function (S133), and determines whether preset keywords are included in the voice acquired in step S132 (S134). The keywords can include words such as convenience store, charging station, and gas station (an abbreviation such as "station" is also acceptable), proper nouns such as sightseeing spots, and words expressing attention (for example, "dangerous", "danger", and "accident").

When the street information simple analysis unit A-2 further determines that any keyword (for example, "convenience store") is included in the voice (S104: Yes), the street information simple analysis unit A-2 transmits this keyword (for example, "convenience store") together with position data and the user terminal identification information for identifying the user terminal D to the location supervision server B (S135).

The location supervision server B acquires, for the transmitted keyword, related information from an external server 14 as needed, and returns the acquired information to the transmitter street information collecting/providing device A according to the user terminal identification information (S136).

This information is received by the street information cooperation control unit A-3, and the street information presentation processing unit A-6 causes a display of the user terminal D to display the information or a speaker to output the information as a navigation voice. This information includes images, letters, sounds, etc. For example, as the information related to the keyword "convenience store", map information of convenience stores within a predetermined radius (for example, within a radius of 1 km) from the position of the transmitter street information collecting/providing device A may be adopted.

Similarly, navigation information of sightseeing spots, gas stations, charging stands, and the like can be provided to the user.

Note that the operation in which the location supervision server B acquires the information from the external server 14 and transmits the information to the street information collecting/providing device A has already described, and thus, here, detailed description is omitted.

In this manner, the user can acquire a map of a desired object by a voice input using the map information acquisition function.

(Course Search Function)

The course search function will be described with reference to the flowchart in FIG. 16.

In the course search function, the position data acquired by the GPS and the voice acquired by the microphone are used, similarly to the map information acquisition function described above.

The street information collection unit A-1 acquires the position data acquired by the GPS as the street information on a steady basis (S141).

When the user activates the course search function, the app prompts, by a screen display or a voice of the user terminal D, the user to input a destination with a voice into the microphone of the user terminal D (S142). For example, when currently "in the vicinity of Oklahoma City in Oklahoma State" is grasped based on the position data acquired in step S141, an audio guidance "it seems in the vicinity of Oklahoma City in Oklahoma State, where are you going today?" is output from the speaker of the user terminal D.

In response to this, when the user utters "Wilmington, N.C. State" into the microphone of the user terminal D, the street information simple analysis unit A-2 recognizes the destination from the voice, using the voice recognition function, after performing noise removal and the like as needed (S143), as described in the map information acquisition function.

The street information simple analysis unit A-2 further transmits the recognized destination together with the position data and the user terminal identification information from the street information cooperation control unit A-3 to the location supervision server B (S144).

In response to this, the location supervision server B creates one or a plurality of course maps based on the position information and the destination, by acquiring road information from the external server 14 in the street device information analysis unit B-3 (S145).

Further, the street device information analysis unit B-3 acquires traffic information related to each course map from the external server 14, and provides the created one or more course maps and the traffic information related to each course map to a device street issue information control unit B-7. The traffic information includes a toll of a toll road when the course map includes the toll road.

The device street issue information control unit B-7 returns the one or a plurality of course maps and the traffic information related to each course map to the transmitter street information collecting/providing device A based on the user terminal identification information (S146).

These pieces of information is received by the street information cooperation control unit A-3, and the street information presentation processing unit A-6 causes a display of the user terminal D to display the information or a speaker to output the information as a navigation voice. The information includes images, characters, sounds, and the like.

For example, from the speaker of the user terminal D, the following content is output as a voice: "there are mainly three courses to Wilmington, N.C. Course 1 is a course using I-20W and I-40W, the distance is 1264 miles and the expected travel time from the current traffic is 18 hours 15 minutes. On the way, there is a traffic jam of about 5 miles near Atlanta, Ga. Course 2 is a course using 1-40, the distance is 1351 miles, and the expected travel time from the current traffic is 19 hours 17 minutes. Course 2 uses a toll road in Missouri on the way, so a $10 charge will be incurred. On the way, a traffic accident has occurred near Cumberland, Tenn. Course 3 is a course using I-20W, the distance is 1400 miles, and the expected travel time from the current traffic is 20 hours 20 minutes. Course 3 uses a toll road in Texas on the way, so a $8 charge will be incurred. On the way, there is a traffic jam of about 5 miles near Atlanta, Ga. Which Course would you like?".

Further, interactive information exchange with voice as below is also possible in combination with the function to provide related information from a keyword, as described in the map information acquisition function.

Audio guidance: "Which Course would you like?"
User: "Course 2"
Audio guidance: "I will show you Course 2. The toll road in Missouri has X service areas. They are also displayed on the screen. Shall I show you the service areas."
User: "Yes"
Audio guidance: "(event is being taken place in a service area. Watermelons and melons are sold direct."

In this manner, the user can acquire data for reference when determining a course by using the course search function.

(Etc Function)

To use the ETC function, the street information collection unit A-1 includes means for reading an electronic toll collection system (ETC) card.

Further, when the vehicle approaches the toll collection station of the toll road, the street information collection unit A-1 reads out the balance deposited on the ETC card. Then, the result is handed over to the street information presentation processing unit A-6 via the street information cooperation control unit A-3.

The street information presentation processing unit A-6 outputs the balance as at least one of an image and a voice from the user terminal D. In addition, the street information presentation processing unit A-6 compares the balance with the toll of the toll road already got in the course search function, and notifies the user of whether the toll can be paid with the balance or the balance is insufficient by outputting it as at least an image or a voice from the user terminal D.

Further, interactive information exchange with voice as below is also possible in combination with the function to provide related information from a keyword, as described in the map information acquisition function.

Audio guidance: "The toll to the destination is $XX. $YY is deposited on ETC. Will you use all or part of it?"
User: "Part"
Audio guidance: "How much of $YY will you use?"
User: "$ZZ"
Audio guidance: "$ZZ. Sure. The remaining points will be $yy. The amount you use will be withdrawn upon card payment."

Further, the following is an example of communication concerning service area usage.

Audio guidance: "Currently, points of $AA are expected to remain. You can easily use the points in the shop with the mark "Drivers' Friends" in the service area until you leave ETC. Would you like to use some or all of the points. The points will not be reduced even if you do not use them."
User: "All."
Audio guidance: "Setting is made. Points of $AA can be used. Please bring this terminal, and enjoy meal, shopping, and so on."

In this manner, the user can smoothly make settlement with the ETC card using the ETC function.

(Traffic Information Providing Function)

As described above, according to the course search function, the traffic information related to each course map is acquired from the external server 14 and is provided to the user terminal D. On the other hand, in the traffic information providing function, the traffic information such as congestion information, accident information, emergency warning information, and service area information is provided from the user terminal D side to the location supervision server B.

Providing the traffic information from the user terminal D to the location supervision server B using the traffic information providing function is performed in an interactive manner with voice, using the function to provide related information from a keyword, which has been described in the map information acquisition function.

Several examples made by provision of information with voice will be given below.

The first example is an example of communication when congestion information is provided by the user with a voice input.

User: "Traffic jam begins on the opposite lane."

Audio guidance: "Traffic jam on the opposite lane near the γ mile post."

User: "That's right."

Audio guidance: "Thank you for providing the traffic jam information. I will use it for traffic jam information in the opposite lane towards Oklahoma City. I will appreciate it if you inform me when the traffic jam is over."

In this manner, the congestion information is transmitted to the location supervision server B and is stored in the street device information accumulation unit B-9. The traffic congestion information accumulated in this manner is transmitted from the location supervision server B to other users who pass nearby, by audio guidance like "a traffic jam has occurred in I-40W toward Oklahoma City near the γ mile post", or is taken into consideration in course search for other users.

The second example is an example of communication when reverse run information is provided by the user with a voice input.

User: "Found a reverse car."

Audio guidance: "OK. The location is I-40W toward Oklahoma City near the γ mile post."

In this way, the reverse drive information is transmitted to the location supervision server B and is stored in the street device information accumulation unit B-9. The reverse drive information accumulated in this way is also transmitted from the location supervision server B to other users passing nearby, by audio guidance like "a vehicle driving in the wrong direction in I-40W toward Oklahoma City near γ mile post has been found. Please be careful".

The third example is an example of communication when falling object information is provided by the user with a voice input.

User: "Found a falling object."

Audio guidance: "A falling object. The location is near the I-40W γ mile post?"

User: "I found a tent-like object near the I-40W γ mile post."

Audio guidance: "A tent-like object near I-40W γ mile post. OK."

In this way, the falling object information is transmitted to the location supervision server B and is stored in the street device information accumulation unit B-9. The falling object information stored in this manner is also notified from the location supervision server B to the users passing nearby, by audio guidance like "a first report, there is a falling object in I-40W near γ mile post. The lane is the overtaking lane. Please be careful when going through it".

Further, the service like below is also available as the location supervision server B mediates calls between street information collecting/providing devices A.

For example, when the street information collecting/providing device A is mounted on an expressway patrol car, the location supervision server B communicates with the street information collecting/providing device A mounted on the expressway patrol car in response to provision of the falling object information to notify the expressway patrol of the falling object information, and further mediates a call between the street information collecting/providing device A mounted on the expressway patrol car and the street information collecting/providing device A of the user who has provided the falling object information.

Audio guidance: "I issue an express order to the highway patrol. Thank you for providing information."

Audio guidance: "Customer, Highway patrol staff wants to talk to you directly, is it OK?"

User: "Yes"

Audio guidance: "Well then, I will put you through."

Highway patrol staff: "We picked up the object safely near the I-40W γ mile post. We were able to deal instantly. Thank you for providing information. Please take care".

In this way, the user can provide the traffic information such as congestion information, accident information, emergency warning information, and service area information to the location supervision server B, using the traffic information providing function.

(Drowsy Driving Prevention Function)

Further, the street information presentation processing unit A-6 talks to the user terminal D with voice guidance and outputs music from the user terminal D at predetermined time intervals during traveling of the vehicle in order to prevent the user from dozing.

Further, the street information simple analysis unit A-2 recognizes the voice, using the voice recognition function, and determines whether the user is sleepy at present, based on the user's voice acquired by the microphone. For this determination, a keyword extraction technique as described in the map information acquisition function is used. That is, the street information simple analysis unit A-2 determines that the user is currently sleepy when preset keywords like "sleepy", "drowsy", "rest", "exhausted", "fatigue" are included in the voice. Alternatively, the street information simple analysis unit A-2 may determine that the user is currently sleepy if no response is given to the audio guidance.

When the user is determined to be currently sleepy by the street information simple analysis unit A-2, the street information presentation processing unit A-6 increases the volume of the sound output from the user terminal D, outputs guidance and music, and proposes countermeasures. The countermeasures include grasping the nearest parking area, service area, etc. based on the position data acquired by the GPS, and proposing a break there.

An example of interactive information exchange with voice, which is performed to prevent drowsy driving, using the function to provide related information from a keyword, as described in the map information acquisition function.

Audio guidance: "Don't tell me you are getting sleepy.

User: "I feel drowsy."

Audio guidance: "Let's take a break in the next service area. The next service area is about M miles away.

Meanwhile, I will talk to you so please answer. Increase the volume by 3 levels."

Audio guidance: "It is about the service area. Bring this user terminal D to the concierge counter. I will show you how to eliminate drowsiness and some goods."

User: "Yes, I will."

In this way, the drowsy driving prevention function can be useful for preventing the user from drowsy driving.

As described above, in a street information processing system according to the present embodiment of the present invention, the street information collecting/providing device A is used as a navigation system such as car navigation in a combination with the user terminal D such as a smart phone.

As described above, according to the street information processing system of each of the embodiments, environmental information is acquired in the street, which changes from moment to moment, information desired by the user is timely provided, and information specialized for individual needs can be provided not only to the electronic signboard 16 but also to the user terminal D such as a smart phone or a tablet.

For example, provision of information as follows is possible.

1) Since the location supervision server B grasps and manages the position of each street information collecting/providing device A and the content of the street information acquired by each street information collecting/providing device A, the location of each street information collecting/providing device can be displayed on the map on the screen of the user terminal D.

2) The same information as the electronic signboard 16 on the street can be browsed and the coupon information can be acquired via the network using the user terminal D.

3) Coupons and the like can be pushed to the user terminal D as the user approaches the electronic signboard 16.

4) CM guidance appropriate for the scene linked with a network video service and a radio service can be performed.

5) Since the location supervision server B collectively manages the positions of the street information collecting/providing devices A, the evacuation guidance information according to an event and a place can be timely provided at the time of disaster.

6) Since the congestion situation near each street information collecting/providing device A can be grasped from the information of a camera and sensors, turning on and off of streetlights can be controlled and air conditioning can be properly controlled.

7) By detecting presence/absence of people, energy saving is possible, such as decreasing lighting of streetlights when nobody is present at night and increasing lighting as someone approaches.

8) When an abnormal sound like "help!" is recognized, streetlights are immediately lit and the scene is photographed by a camera, and the captured image is issued together with the sound "help!" to the location supervision server B via the communication network 12, whereby the abnormality can be automatically reported. Thereby, preventive measures against crimes are possible.

9) Even when accessing the Internet etc. at the time of disaster and the lines are congested or disconnected, information for determining what kind of action should be taken at the position where each street information collecting/providing device A is located can be acquired.

While some embodiments of the present invention have been explained, these embodiments have been presented only as an example, and are not intended to limit the scope of the inventions. Indeed, the embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the invention.

For example, the street information collecting/providing device A is not necessarily limited to those arranged outdoors as long as it can collect street information in the street information collection unit A-1, and those arranged indoors are also adaptable. Therefore, in this specification, the street is not necessarily limited to the outdoors but may be an indoor stadium such as a dome stadium, an underground shopping center, a building, a shopping center, an interior of a train or a car.

The invention claimed is:

1. A street information processing system including a plurality of clients arranged on a street in a distributed manner and a server communicatively connected to the plurality of clients via a communication network,
wherein each of the clients comprises client circuitry configured to:
collect street information near an arrangement place;
determine whether the street information collected is information required to be provided to the server; and
transmit the street information determined to be required to be provided to the server, adding client identification information for identifying the client, and
wherein the server comprises server circuitry configured to:
analyze the street information transmitted by the client;
determine one or more clients, from among the plurality of clients, for providing information determined based on an analysis result;
transmit the information determined based on the analysis result to the one or more clients determined;
transmit the analysis result together with server identification information for identifying the server to an external server determined in advance according to analysis result;
acquire external server information provided from the external server according to the analysis result and the server identification information transmitted to the external server; and
accumulate the external server information together with an acquisition time when the external server information has been acquired, and external server identification information for identifying the external server.

2. The street information processing system according to claim 1, wherein the server circuitry is further configured to acquire position information of the client, and to accumulate the acquired position information.

3. The street information processing system according to claim 1,
wherein the server circuitry is further configured to acquire the street information and the client identification information transmitted by the client, and to accumulate the street information and the client identification information together with acquisition time information indicating a time of acquisition, and
wherein the client identification information and the acquisition time information accumulated are used together with the street information accumulated, for an analysis performed by the server.

4. The street information processing system according to claim 3, wherein the server circuitry is further configured to perform an analysis by comparing the street information accumulated with a threshold or a characteristic set according to a corresponding client based on corresponding client identification information.

5. The street information processing system according to claim 1, wherein the client circuitry is further configured to transmit the information transmitted by the server to a user terminal by wireless communication.

6. The street information processing system according to claim 1, wherein, when the street information collected is an image photographed by a camera at a time of a disaster and the image is transmitted to the server, the image is further transmitted to the external server.

7. The street information processing system according to claim 1,
wherein the client is installed in a moving body, and
wherein, when the street information acquired by client during movement of the moving body is a voice acquired by a microphone, the client circuitry is further configured to transmit information related to a keyword included in the voice, of the information transmitted by the server, to a user terminal by wireless communication.

8. The street information processing system according to claim 7, wherein the keyword is convenience store, and the related information is map information of the convenience store.

9. The street information processing system according to claim 8, wherein, when the voice including the keyword of the convenience store is transmitted to the server, the server circuitry is further configured to output an analysis result requesting transmission of information regarding convenience stores within a predetermined radius from the position of the client.

10. The street information processing system according to claim 1, wherein
the client is mounted on a vehicle,
the street information acquired by the client during movement of the vehicle includes position data acquired by a GPS and a voice acquired by a microphone, and the voice includes a destination of the vehicle,
the client circuitry determines the street information acquired during movement of the vehicle as the information required to be provided to the server,
the server circuitry creates one or a plurality of course maps for movement of the vehicle based on the position data and the destination by acquiring road information from an external server, further acquires traffic information related to each of the course maps from the external server, and provides the one or a plurality of created course maps and the traffic information related to each of the course maps as the information determined based on the analysis result,
the server circuitry determines a client to which the position data and the street information have been transmitted as the one or more clients for providing information, and
the client circuitry causes a user terminal to output the one or a plurality of course maps and the traffic information related to each of the course map transmitted by the server, as at least either an image or a voice.

11. The street information processing system according to claim 10,
wherein the client circuitry is further configured to perform an electronic toll collection (ETC) function, and
wherein the ETC function reads a balance deposited in an ETC card, causes the user terminal to output the read balance as at least either an image or a voice, and causes the user terminal to output insufficiency of the balance as at least either an image or a voice when the toll of a toll road is higher than the balance.

12. The street information processing system according to claim 10, wherein the traffic information includes at least one of congestion information, accident information, emergency warning information, and service area information.

13. The street information processing system according to claim 10, wherein the client circuitry further causes the user terminal to output a sound for preventing a driver of the vehicle from dozing at predetermined time intervals during traveling of the vehicle.

14. A street information processing system including a plurality of clients arranged on a street in a distributed manner and a server communicatively connected to the plurality of clients via a communication network,
wherein each of the clients comprises client circuitry configured to:
collect street information near an arrangement place;
determine whether the street information collected is information required to be provided to the server; and
transmit the street information determined to be required to be provided to the server, adding client identification information for identifying the client, and
wherein the server comprises server circuitry configured to:
analyze the street information transmitted by the client;
determine one or more clients, from among the plurality of clients, for providing information determined based on an analysis result;
transmit the information determined based on the analysis result to the one or more clients determined;
store content to be displayed on electronic signboard by the client, and a display condition;
store position information of the client; and
accumulate external server information provided by an external server, an acquisition time when the external server information has been acquired, and an external server identification information for identifying the external server in association with one another, and
wherein the server transmits some or all, except the external server identification information, of the information accumulated together with the external server identification information, to the one or more clients.

15. A street information processing system including a plurality of clients arranged on a street in a distributed manner and a server communicatively connected to the plurality of clients via a communication network,
wherein each of the clients comprises client circuitry configured to:
collect street information near an arrangement place;
determine whether the street information collected is information required to be provided to the server; and
transmit the street information determined to be required to be provided to the server, adding client identification information for identifying the client, and
wherein the server comprises server circuitry configured to:
analyze the street information transmitted by the client;
determine one or more clients, from among the plurality of clients, for providing information determined based on an analysis result;
transmit the information determined based on the analysis result to the one or more clients determined;
transmit the analysis result together with server identification information for identifying the server to an external server determined in advance according to the analysis result, wherein, when the street information collected is an image photographed by a camera at a time of a disaster and the image is transmitted to the server, the image is further transmitted to the external server; and
acquire evacuation guidance information and announce information for the disaster provided from the external server according to the analysis result and the server identification information transmitted to the external server.

16. A street information processing system including a plurality of clients arranged on a street in a distributed manner and a server communicatively connected to the plurality of clients via a communication network,
wherein each of the clients comprises client circuitry configured to:
collect street information near an arrangement place;
determine whether the street information collected is information required to be provided to the server; and
transmit the street information determined to be required to be provided to the server, adding client identification information for identifying the client, and
wherein the server comprises server circuitry configured to:
analyze the street information transmitted by the client;
determine one or more clients, from among a plurality of clients, for providing information determined based on an analysis result;
transmit the information determined based on the analysis result to the one or more clients determined, wherein the client is mounted on a vehicle,
the street information acquired by the client during movement of the vehicle includes position data acquired by a GPS and a voice acquired by a microphone, and the voice includes a destination of the vehicle,
the client circuitry determines the street information acquired during movement of the vehicle as the information required to be provided to the server,
the server circuitry creates one or a plurality of course maps for movement of the vehicle based on the position data and the destination by acquiring road information from an external server, further acquires traffic information related to each of the course maps from the external server, and provides the one or a plurality of created course maps and the traffic information related to each of the course maps as the information determined based on the analysis result,
the server circuitry determines the client to which the position data and the street information have been transmitted as the one or more clients for providing information, and
the client circuitry causes a user terminal to output the one or a plurality of course maps and the traffic information related to each of the course map transmitted by the server, as at least either an image or a voice; and
acquire, when the course map includes a toll road, a toll of the toll road from the external server, based on the one or the plurality of created course maps and the traffic information related to each of the course maps, and provide the acquired toll as the information determined based on the analysis result,
wherein the client circuitry causes the user terminal to output the toll transmitted from the server, as at least either an image or a voice.

* * * * *